US012706718B2

(12) United States Patent
Munier et al.

(10) Patent No.: US 12,706,718 B2
(45) Date of Patent: Aug. 11, 2026

(54) COLLISION HANDLING FOR POSITIONING REFERENCE SIGNALS

(71) Applicant: TELEFONAKTIEBOLAGET LM ERICSSON (PUBL), Stockholm (SE)

(72) Inventors: Florent Munier, Västra Frölunda (SE); Siva Muruganathan, Stittsville (CA); Ritesh Shreevastav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 355 days.

(21) Appl. No.: 18/560,249

(22) PCT Filed: May 11, 2022

(86) PCT No.: PCT/IB2022/054408

§ 371 (c)(1),
(2) Date: Nov. 10, 2023

(87) PCT Pub. No.: WO2022/238941

PCT Pub. Date: Nov. 17, 2022

(65) Prior Publication Data

US 2024/0243876 A1 Jul. 18, 2024

Related U.S. Application Data

(60) Provisional application No. 63/187,205, filed on May 11, 2021.

(51) Int. Cl.

| | |
|---|---|
| ***H04L 5/00*** | (2006.01) |
| ***H04W 72/232*** | (2023.01) |
| ***H04W 72/563*** | (2023.01) |

(52) U.S. Cl.

CPC ......... *H04L 5/0051* (2013.01); *H04W 72/232* (2023.01); *H04W 72/563* (2023.01)

(58) Field of Classification Search

None

See application file for complete search history.

(56) References Cited

U.S. PATENT DOCUMENTS

| | | | | |
|---|---|---|---|---|
| 2020/0154449 | A1* | 5/2020 | Akkarakaran | H04W 72/56 |
| 2021/0337377 | A1* | 10/2021 | Manolakos | G01S 5/0236 |
| 2021/0360570 | A1* | 11/2021 | Manolakos | H04W 64/006 |
| 2022/0029763 | A1* | 1/2022 | Manolakos | H04L 5/0094 |
| 2022/0039135 | A1* | 2/2022 | Manolakos | H04L 5/0048 |
| 2022/0373634 | A1* | 11/2022 | Manolakos | H04W 24/08 |

(Continued)

OTHER PUBLICATIONS

Interdigital Inc., Discussion on potential positioning enhancements, 3GPP TSG RAN WG1 #103-e, R1-2008491, e-Meeting, Oct. 26-Nov. 13, 2020.

(Continued)

*Primary Examiner* — Duc T Duong

(74) *Attorney, Agent, or Firm* — Ericsson Inc.

(57) ABSTRACT

Systems and methods for generating and configuring priority indication parameters associated with positioning measurements and calculations are provided herein. A priority indicator can be signaled to a wireless device and used for determining a priority associated with a positioning reference signal and an overlapping downlink channel transmission. The wireless device selects which overlapping transmission to measure/receive/process and which to drop.

29 Claims, 10 Drawing Sheets

(56) References Cited

U.S. PATENT DOCUMENTS

| | | | | |
|---|---|---|---|---|
| 2023/0020648 | A1* | 1/2023 | Cha | G01S 5/0036 |
| 2023/0108914 | A1* | 4/2023 | Manolakos | H04L 5/0051<br>370/329 |
| 2023/0283424 | A1* | 9/2023 | Rao | H04L 5/0048<br>370/329 |
| 2024/0007990 | A1* | 1/2024 | Guo | H04W 76/28 |
| 2024/0187903 | A1* | 6/2024 | Hasegawa | H04B 17/328 |

OTHER PUBLICATIONS

Moderator (CATT), FL Summary #4 for Potential Positioning Enhancements, 3GPP TSG RAN WG1 Meeting #103-e, R1-2009396, e-meeting, Oct. 26-Nov. 13, 2020.

RP-210628, Intel Corporation et al., "Revised WID on NR Positioning Enhancements", 3GPP TSG RAN Meeting #91e, Mar. 16-26, 2022, Electronic Meeting.

VIVO, Discussion on potential positioning enhancements, 3GPP TSG RAN WG1 #103-e, R1-2007666, e-Meeting, Oct. 26-Nov. 13, 2020.

ISR and Written Opinion From Corresponding Application PCT/IB2022/054408, May 10, 2022.

* cited by examiner

COLLISION HANDLING FOR POSITIONING REFERENCE SIGNALS

CROSS REFERENCE TO RELATED APPLICATIONS

This application claims the benefit of U.S. Provisional Application No. 63/187,205 filed on May 11, 2021, the entire contents of which are hereby incorporated by reference.

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz). Besides the typical mobile broadband use case, NR is being developed to also support machine type communication (MTC), ultra-low latency critical communications (URLCC), side-link device-to-device (D2D) and other use cases.

Positioning and location services have been topics in LTE standardization since 3GPP Release 9. An objective was to fulfill regulatory requirements for emergency call positioning but other use case like positioning for Industrial Internet of Things (I-IoT) are also considered. Positioning in NR is supported by the example architecture shown in FIG. 1. LMF 108A represents the location management function entity in NR. There are also interactions between the LMF 108A and the gNodeB 110 via the NRPPa protocol. The interactions between the gNodeB 110 and the device (UE) 112 are supported via the Radio Resource Control (RRC) protocol, while the location node 108A interfaces with the UE 112 via the LTE positioning protocol (LPP). LPP is common to both NR and LTE technologies. Other network nodes, such as Access and Mobility Management Function (AMF) 108B and evolved Serving Mobile Location Center (e-SMLC) 108C, may be involved in positioning support.

Note 1: The gNB 110B and ng-eNB 110A may not always both be present.

Note 2: When both the gNB 110B and ng-eNB 110A are present, the NG-C interface is only present for one of them.

In the legacy LTE standards, the following techniques are supported:

- Enhanced Cell ID. Essentially cell ID information to associate the device to the serving area of a serving cell, and then additional information to determine a finer granularity position.
- Assisted GNSS. GNSS information retrieved by the device, supported by assistance information provided to the device from E-SMLC
- OTDOA (Observed Time Difference of Arrival). The device estimates the time difference of reference signals from different base stations and sends to the E-SMLC for multilateration.
- UTDOA (Uplink TDOA). The device is requested to transmit a specific waveform that is detected by multiple location measurement units (e.g. an eNB) at known positions. These measurements are forwarded to E-SMLC for multilateration.
- Sensor methods such as biometric pressure sensor which provides vertical position of the device and Inertial Motion Unit (IMU) which provides displacement.

The NR positioning for Release 16, based on the 3GPP NR radio-technology, is positioned to provide added value in terms of enhanced location capabilities. The operation in low and high frequency bands (i.e. below and above 6 GHZ) and utilization of massive antenna arrays provide additional degrees of freedom to substantially improve the positioning accuracy. The possibility to use wide signal bandwidth in low and especially in high bands brings new performance bounds for user location for well-known positioning techniques based on OTDOA and UTDOA, Cell-ID or E-Cell-ID etc., utilizing timing measurements to locate a UE.

In NR Release 16, several positioning features have been specified including reference signals, measurements, and positioning methods.

Reference Signals:

- A new downlink (DL) reference signal, the NR DL Positioning Reference Signal (PRS) was specified. A benefit of this signal in relation to the LTE DL PRS is the increased bandwidth, configurable from 24 to 272 RBs, which gives a big improvement in Time of Arrival (TOA) accuracy. The NR DL PRS can be configured with a comb factor of 2, 4, 6 or 12. Comb-12 allows for twice as many orthogonal signals as the comb-6 LTE PRS. Beam sweeping is also supported on NR DL PRS in Rel-16.
- A new uplink (UL) reference signal, based on the NR UL SRS was introduced and called "SRS for positioning". The Release 16 NR SRS for positioning allows for a longer signal, up to 12 symbols (compared to 4 symbols in Rel. 15 SRS), and a flexible position in the slot (only last six symbols of the slot can be used in Rel. 15 SRS). It also allows for a staggered comb RE pattern for improved TOA measurement range and for more orthogonal signals based on comb offsets (comb 2, 4 and 8) and cyclic shifts. The use of cyclic shifts longer than the OFDM symbol divided by the comb factor is, however, not supported by Rel. 16 despite that this is the main advantage of comb-staggering at least in indoor scenarios. Power control based on neighbor cell SSB/DL PRS is supported as well as spatial QCL relations towards a CSI-RS, an SSB, a DL PRS or another SRS.

Positioning Techniques

NR positioning supports the following methods:

Methods already in LTE and enhanced in NR:

- DL TDOA
- E-CID
- RAT independent methods (based on non-3GPP sensors such as GPS, pressure sensors, Wifi signals, Bluetooth, etc).
- UL TDOA Newly introduced methods in NR:

- Multicell RTT: the LMF collects RTT (round trip time) measurement as the basis for multilateration
- DL angle of departure (AoD) and UL angle of arrival (AoA), where multilateration is done using angle and power (RSRP) measurements Measurements:

In NR Rel. 16, the following UE measurements are specified:

DL RSTD, allowing for e.g. DL TDOA positioning

Multi cell UE Rx-Tx Time Difference measurement, allowing for multi cell RTT measurements

DL PRS RSRP

In NR Rel. 16, the following gNB measurements are specified:

UL-RTOA, useful for UL TDOA positioning gNB Rx-Tx time difference, useful for multi cell RTT measurements

UL SRS-RSRP

AoA and ZoA

Signals Configurations:

A new DL reference signal, the NR DL PRS was specified in NR Rel. 16. A benefit of this signal in relation to the LTE DL PRS is the increased bandwidth, configurable from 24 to 272 RBs, which gives a big improvement in TOA accuracy. The NR DL PRS can be configured with a comb factor of 2, 4, 6 or 12. Comb-12 allows for twice as many orthogonal signals as the comb-6 LTE PRS. Beam sweeping is also supported on NR DL PRS in Rel-16.

In NR Rel. 16, the DL PRS is configured by each cell separately, and the location server (LMF) collects all configuration via the NRPPa protocol, before sending an assistance data (AD) message to the UE via the LPP protocol.

Rel-16 NR DL PRS is Organized in a 3-Level Hierarchy:

PRS frequency layer: gathers PRS resource sets from (potentially) multiple base station, having common parameters in common. If two resource sets are in the same frequency layer, they:

Operate in the same band with the same subcarrier spacing

Have the same comb factor

Have the same starting PRB and bandwidth

PRS Resource set: corresponds to a collection of PRS beams (resources) which are all originating from the same Transmission and reception point (TRP). All resource in the same set have the same comb factor PRS resource: correspond to a beam transmitting the PRS In NR Rel. 16, enhancements of the NR UL SRS were specified. The Rel. 16 NR SRS for positioning allows for a longer signal, up to 12 symbols (compared to 4 symbols in Rel. 15), and a flexible position in the slot (only last six symbols of the slot can be used in Rel. 15). It also allows for a staggered comb RE pattern for improved TOA measurement range and for more orthogonal signals based on comb offsets (comb 2, 4 and 8) and cyclic shifts. The use of cyclic shifts longer than the OFDM symbol divided by the comb factor is, however, not supported by Rel. 16 despite that this is the main advantage of comb-staggering at least in indoor scenarios. Power control based on neighbor cell SSB/DL PRS is supported as well as spatial QCL relations towards a CSI-RS, an SSB, a DL PRS or another SRS.

The DL PRS is configured by each cell separately, and the location server (LMF) collects all configuration via the NRPPa protocol, before sending an assistance data (AD) message to the UE via the LPP protocol. In the uplink, the SRS signal is configured in RRC by the serving gnodeB, which in turns forward appropriate SRS configuration parameters to the LMF upon request.

Similar to LTE, in NR a unique reference signal is transmitted from each antenna port at the gNB for downlink channel estimation at a UE. Reference signals for downlink channel estimation are commonly referred to as channel state information reference signal (CSI-RS).

A CSI-RS signal is transmitted on a set of time-frequency resource elements (REs) associated with an antenna port. For channel estimation over a system bandwidth, CSI-RS is typically transmitted over the whole system bandwidth. The set of REs used for CSI-RS transmission is referred to as CSI-RS resource. From a UE point of view, an antenna port is equivalent to a CSI-RS that the UE shall use to measure the channel. Up to 32 (i.e. N_tx=32) antenna ports are supported in NR and thus 32 CSI-RS signals can be configured for a UE.

In NR, the following three types of CSI-RS transmissions are supported:

Periodic CSI-RS Transmission: CSI-RS is transmitted periodically in certain subframes or slots. This CSI-RS transmission is semi-statically configured using parameters such as CSI-RS resource, periodicity and subframe or slot offset similar to LTE.

Aperiodic CSI-RS Transmission: This is a one-shot CSI-RS transmission that can happen in any subframe or slot. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through PDCCH. The triggering may also include selecting a CSI-RS resource from multiple CSI-RS resources.

Semi-Persistent CSI-RS (SP CSI-RS) Transmission: Similar to periodic CSI-RS, resources for semi-persistent CSI-RS transmissions are semi-statically configured with parameters such as periodicity and subframe or slot offset. However, unlike periodic CSI-RS, dynamic signaling is needed to activate and possibly deactivate the CSI-RS transmission. An example is shown in FIG. 2. In NR, activation and deactivation is performed using MAC CE signaling.

Multiple Transmission/Reception Points (TRP)

A cell can consist of multiple TRPs with each TRP located in distinct coordinates, an example of which is shown in FIG. 3. This sort of configuration is expected to be used in I-IOT scenarios. As an example, one cell with 10, 20 or even more TRPs may be used to cover a complete factory hall.

For positioning, as such, three distinct co-ordinates are required to perform multilateration. With this sort of scenario where a serving cell has multiple TRPs located in distinct co-ordinates, it should be possible to exploit this for positioning.

SUMMARY

It is an object of the present disclosure to obviate or mitigate at least one disadvantage of the prior art.

There are provided systems and methods for configuring priority of positioning reference signals with respect to other signals/channels.

In a first aspect there is provided a method performed by a wireless device. The wireless device can comprise a radio interface and processing circuitry and be configured to signal that the wireless device can perform positioning measurements without a measurement gap. The wireless device receives configuration information including a priority indicator. The wireless device determines a priority associated with a positioning reference signal (PRS) and an overlapping downlink (DL) channel transmission in accordance with the priority indicator. Responsive to determining that the PRS priority is higher than the DL channel, at least one PRS outside of the measurement gap can be measured. Responsive to determining that the PRS priority is lower than the DL channel, the DL channel transmission can be received.

In another aspect there is provided a method performed by a network node. The network node can comprise a radio interface and processing circuitry and be configured to obtain capability information that a wireless device can perform positioning measurements without a measurement gap. The network node generates configuration information including a priority indicator indicating a priority associated with a positioning reference signal (PRS) and an overlapping downlink (DL) channel transmission. The network node transmits, to the wireless device, the configuration information including the priority indicator.

In some embodiments, the priority indicator is received in a Downlink Control Information (DCI) message. The DCI message can be one of a DL DCI format 1_1 or a DL DCI format 1_2. In some embodiments, the DCI message can dynamically schedule the DL channel.

In some embodiments, the priority indicator can indicate that the PRS priority is lower than a first type of data on the DL channel, and the PRS priority is higher than a second type of data on the DL channel. A first type of data can be ultra-reliable low latency communication (URLLC).

In some embodiments, the priority indicator can be transmitted/received in one of a RRC message, a MAC CE message and/or PRS configuration information.

In some embodiments, the priority indicator can be transmitted/received in one of a PDSCH-Config information element (IE), a SPS-Config IE, a NZP-CSI-RS-Resource IE, a NZP-CSI-RS-ResourceSet IE, a CSI-ResourceConfig IE, and/or a CSI-AperiodicTriggerStateList IE.

In some embodiments, the priority indicator can indicate that the PRS priority is lower than at least one of a periodic reference signal, an aperiodic reference signal, and/or a semi-persistent reference signal.

In some embodiments, the DL channel is one of a physical downlink shared channel (PDSCH) and a physical downlink control channel (PDCCH). The DL channel can be dynamically scheduled.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Figure 1:
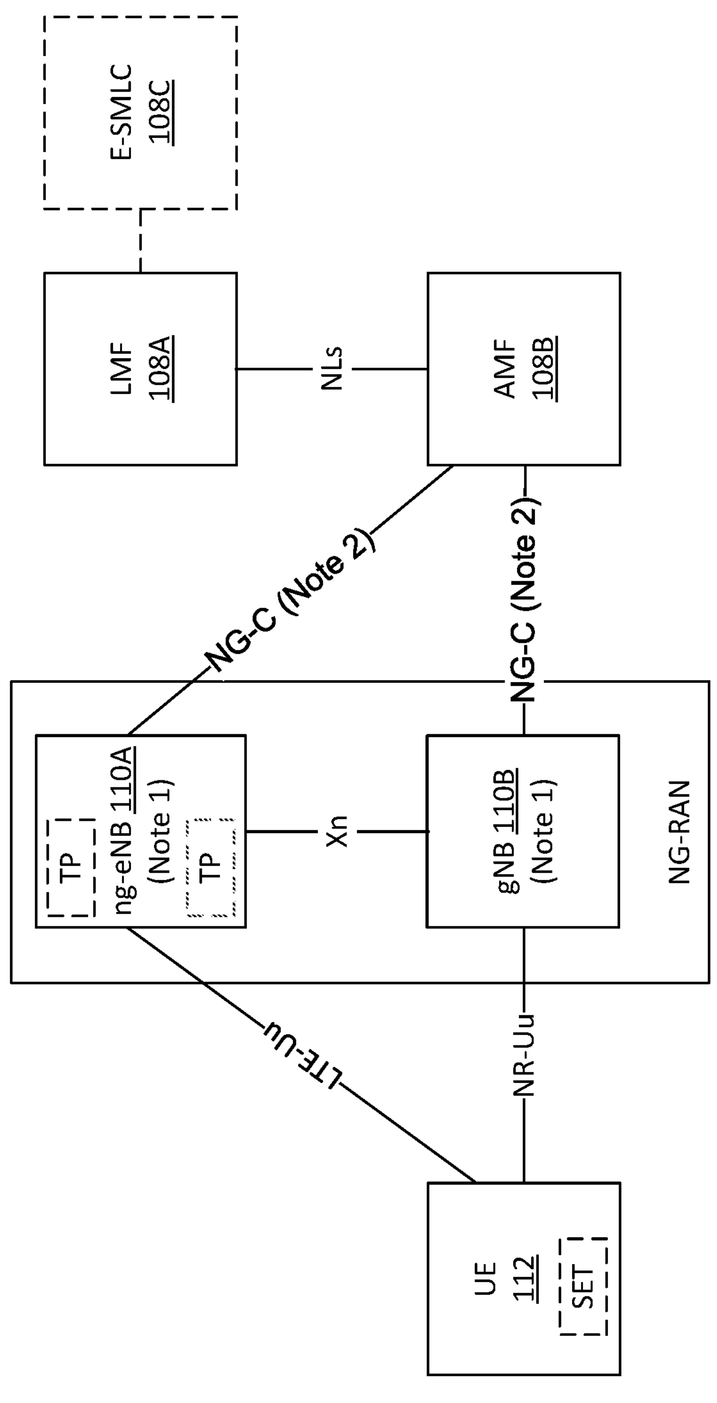
FIG. 1 illustrates an example of NR positioning architecture.
Figure 2:
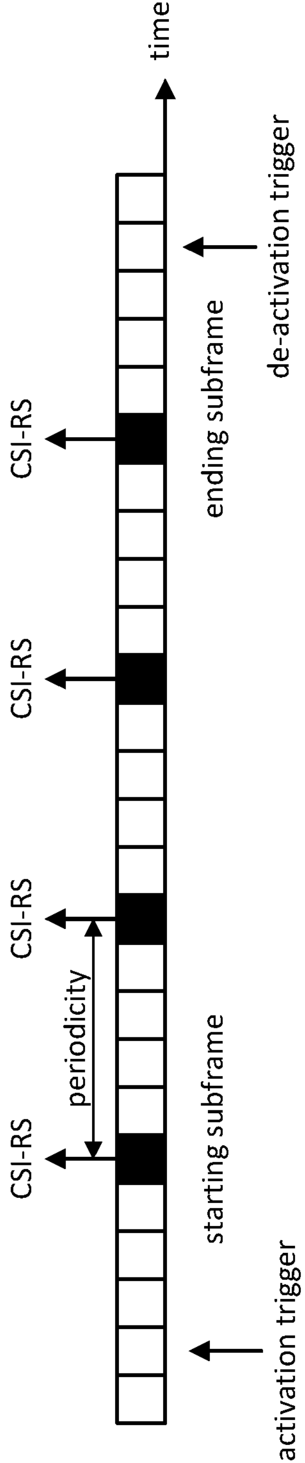
FIG. 2 illustrates an example of Semi-Persistent CSI-RS transmission.
Figure 3:
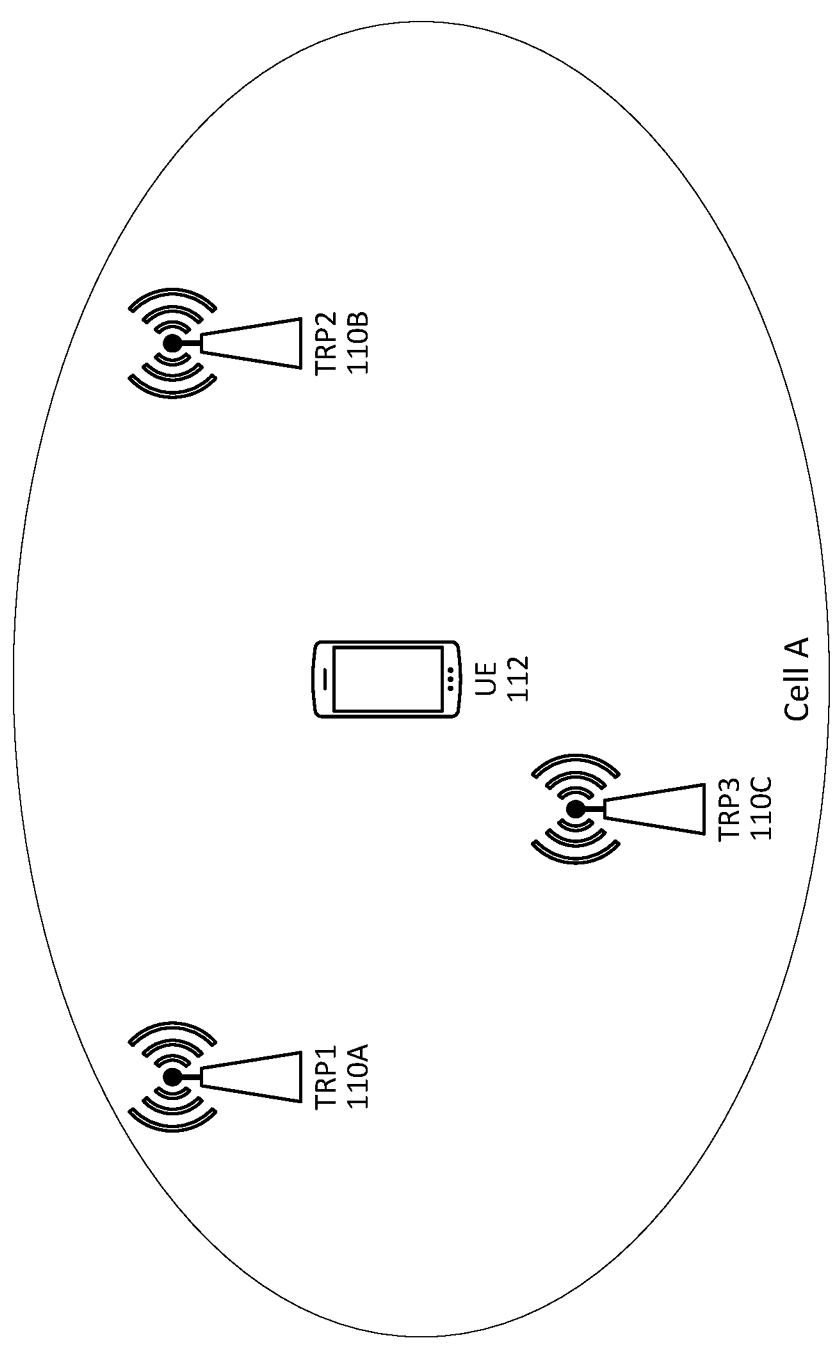
FIG. 3 illustrates an example of multi-TRP in a cell.
Figure 4:
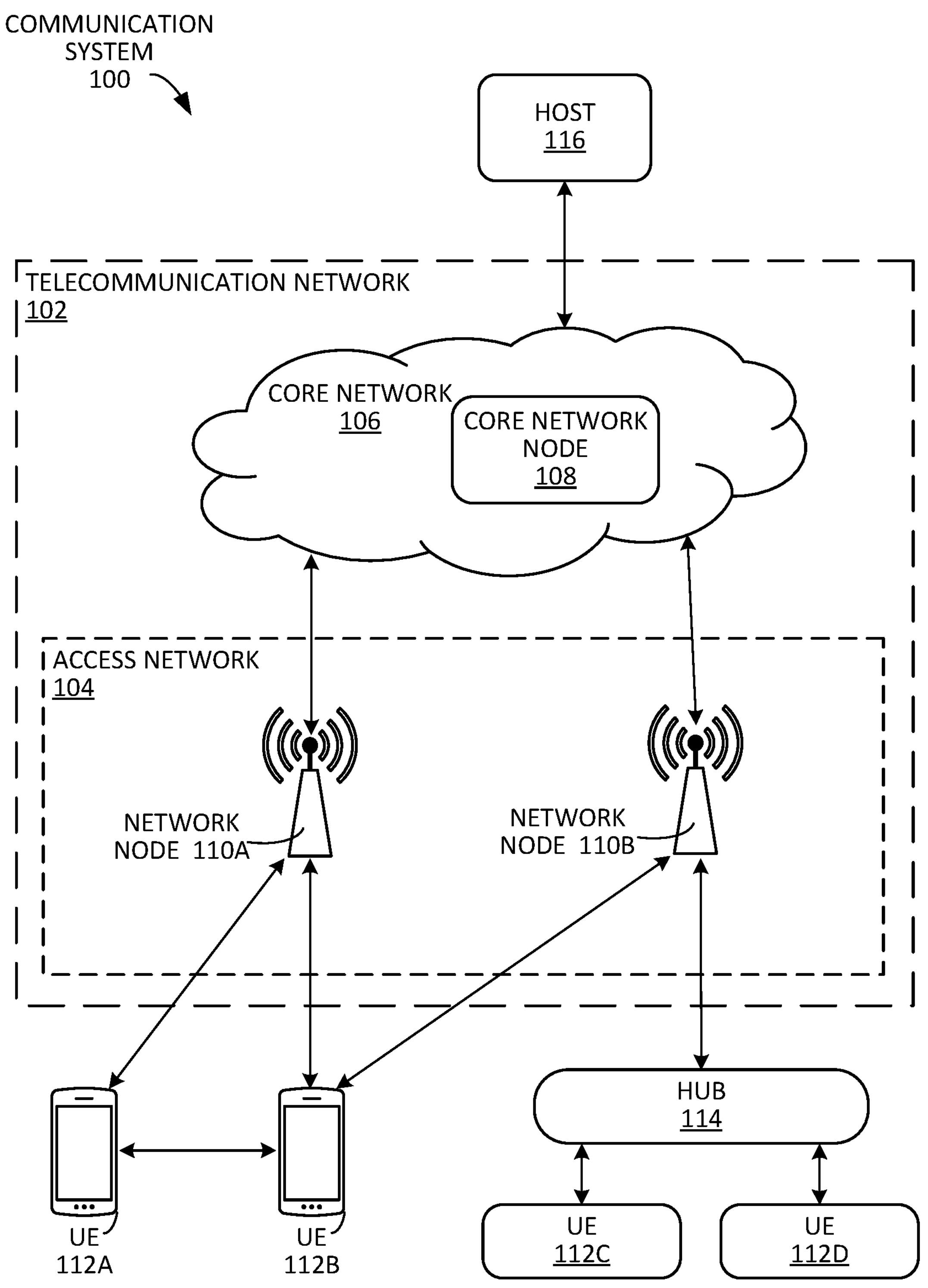
FIG. 4 is an example communication system.

FIG. 4 illustrates an example of a communication system 100 in accordance with some embodiments.

In the example, the communication system 100 includes a telecommunication network 102 that includes an access network 104, such as a radio access network (RAN), and a core network 106, which includes one or more core network nodes 108. The access network 104 includes one or more access network nodes, such as network nodes 110A and 110B (one or more of which may be generally referred to as network nodes 110), or any other similar 3rd Generation Partnership Project (3GPP) access node or non-3GPP access point. The network nodes 110 facilitate direct or indirect connection of user equipment (UE), such as by connecting UEs 112A, 112B, 112C, and 112D (one or more of which may be generally referred to as UEs 112) to the core network 106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 100 may include any number of wired or wireless networks, network nodes, UEs, and/or any other components or systems that may facilitate or participate in the communication of data and/or signals whether via wired or wireless connections. The communication system 100 may include and/or interface with any type of communication, telecommunication, data, cellular, radio network, and/or other similar type of system.

The UEs 112 may be any of a wide variety of communication devices, including wireless devices arranged, configured, and/or operable to communicate wirelessly with the network nodes 110 and other communication devices. Similarly, the network nodes 110 are arranged, capable, configured, and/or operable to communicate directly or indirectly with the UEs 112 and/or with other network nodes or equipment in the telecommunication network 102 to enable and/or provide network access, such as wireless network access, and/or to perform other functions, such as administration in the telecommunication network 102.

In the depicted example, the core network 106 connects the network nodes 110 to one or more hosts, such as host 116. These connections may be direct or indirect via one or more intermediary networks or devices. In other examples, network nodes may be directly coupled to hosts. The core network 106 includes one or more core network nodes (e.g. core network node 108) that are structured with hardware and software components. Features of these components may be substantially similar to those described with respect to the UEs, network nodes, and/or hosts, such that the descriptions thereof are generally applicable to the corresponding components of the core network node 108. Example core network nodes include functions of one or more of a Mobile Switching Center (MSC), Mobility Management Entity (MME), Home Subscriber Server (HSS), Location Management Function (LMF), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 116 may be under the ownership or control of a service provider other than an operator or provider of the access network 104 and/or the telecommunication network 102, and may be operated by the service provider or on behalf of the service provider. The host 116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 100 of FIG. 4 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g. 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 102 is a cellular network that implements 3GPP standardized features. Accordingly, the telecommunications network 102 may support network slicing to provide different logical networks to different devices that are connected to the telecommunication network 102. For example, the telecommunications network 102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 112 are configured to transmit and/or receive information without direct human interaction. For instance, a UE may be designed to transmit information to the access network 104 on a predetermined schedule, when triggered by an internal or external event, or in response to requests from the access network 104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 114 communicates with the access network 104 to facilitate indirect communication between one or more UEs (e.g. UE 112C and/or 112D) and network nodes (e.g. network node 110B). In some examples, the hub 114 may be a controller, router, content source and analytics, or any of the other communication devices described herein regarding UEs. For example, the hub 114 may be a broadband router enabling access to the core network 106 for the UEs. As another example, the hub 114 may be a controller that sends commands or instructions to one or more actuators in the UEs. Commands or instructions may be received from the UEs, network nodes 110, or by executable code, script, process, or other instructions in the hub 114. As another example, the hub 114 may be a data collector that acts as temporary storage for UE data and, in some embodiments, may perform analysis or other processing of the data. As another example, the hub 114 may be a content source. For example, for a UE that is a VR headset, display, loudspeaker or other media delivery device, the hub 114 may retrieve VR assets, video, audio, or other media or data related to sensory information via a network node, which the hub 114 then provides to the UE either directly, after performing local processing, and/or after adding additional local content. In still another example, the hub 114 acts as a proxy server or orchestrator for the UEs, in particular in if one or more of the UEs are low energy IoT devices.

The hub 114 may have a constant/persistent or intermittent connection to the network node 110B. The hub 114 may also allow for a different communication scheme and/or schedule between the hub 114 and UEs (e.g. UE 112C and/or 112D), and between the hub 114 and the core network 106. In other examples, the hub 114 is connected to the core network 106 and/or one or more UEs via a wired connection. Moreover, the hub 114 may be configured to connect to an M2M service provider over the access network 104 and/or to another UE over a direct connection. In some scenarios, UEs may establish a wireless connection with the network nodes 110 while still connected via the hub 114 via a wired or wireless connection. In some embodiments, the hub 114 may be a dedicated hub—that is, a hub whose primary function is to route communications to/from the UEs from/to the network node 110B. In other embodiments, the hub 114 may be a non-dedicated hub—that is, a device which is capable of operating to route communications between the UEs and network node 110B, but which is additionally capable of operating as a communication start and/or end point for certain data channels.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G/NR concepts, beams may be used instead of cells and, as such, it is important to note that the concepts described herein are equally applicable to both cells and beams.

In NR Release 16, the PRS-based measurements (including PRS RSRP, RSTD for OTDOA and UE Rx-Tx for RTT) are all made in the presence of measurement gaps. During a measurement gap, the UE can expect that the network will not transmit any data and thus the UE can tune itself specifically to measure the PRS. For example, to measure PRS (e.g. DL PRS), the UE can potentially utilize a different bandwidth than the active bandwidth part it is configured with to receive data.

In NR Release 17, it was agreed, to specify enhancements to enable measuring the DL PRS without the need for measurement gaps. If the bandwidth part of the UE is wide enough to cover the DL PRS bandwidth, the UE can measure the PRS without requesting measurement gaps. However, collision with the data channels and other downlink reference signals may be an issue needed to be addressed.

Certain aspects of this disclosure and their embodiments may provide solutions to these or other challenges. Some embodiments described herein include defining the UE behaviour and conditions when no measurement gaps need to be requested by the UE. Some embodiments include defining the collision handling rules when DL PRS collides with other downlink channels and reference signals. Some embodiments include PRS dropping rules when collisions with other signals and channels occur. In particular, a configurable priority between the reception/processing of DL PRS and PDSCH and CSI-RS can be introduced.

In one proposed solution, a rule can be defined such that a UE can measure/process a DL PRS without configuration of measurement gaps when the DL PRS is received from a serving cell of the UE. In addition, another condition that may be applicable is that the UE can measure/process a DL PRS with configuration of measurement gaps when the bandwidth of the DL PRS is within the active BWP.

When the DL PRS is received without configuration of measurement gaps, the following example solutions are considered to handle collision with PDSCH and CSI-RS:

- A priority indicator can be configured/indicated for dynamically scheduled PDSCH to indicate priority of dynamically scheduled PDSCH over DL PRS.
- A priority indicator can be configured for semi-persistently scheduled PRS to indicate priority of dynamically scheduled PDSCH over DL PRS.
- Priority indicators can be configured to indicate the priority of periodic NZP CSI-RS, aperiodic NZP CSI-RS, or semi-persistent NZP CSI-RS to indicate the priority of these signals over DL PRS.

If the above example priority indicators indicate that PDSCH or NZP CSI-RS are prioritized over DL PRS, then DL PRS is dropped by the UE and the UE processes the PDSCH or NZP CSI-RS transmission. Otherwise, the DL PRS is processed and the PDSCH or NZP CSI-RS with lower priority is dropped. The priority indication information can be exchanged via RRC configuration, MAC CE, or DCI signaling.

Certain embodiments may provide one or more of the following technical advantage(s). The example proposed solution(s) allow for the positioning system in NR to work with gap-less (i.e., without measurement gaps) PRS measurement. This can improve measurement latency and bypass the measurement gap request procedure. Mechanisms are introduced to efficiently enable gap-less measurement while ensuring quality measurement can be made, such as the condition for gap-less measurement being clearly defined, and dropping rules being defined to avoid collision and are made configurable when possible to give maximum control to the network in terms of efficiency.

UE Behaviour and Conditions for Processing DL-PRS without Measurement Gaps

In an exert from 3GPP TS 38.214 v 16.5.0, the UE behaviour is specified to always use measurement gaps when receiving DL PRS as:

The UE is expected to measure the DL PRS resource outside the active DL BWP or with a numerology different from the numerology of the active DL BWP if the measurement is made during a configured measurement gap. When the UE is expected to measure the DL PRS resource outside the active DL BWP it may request a measurement gap via higher layer parameter NR-PRS-MeasurementInfoList [TS 38.331]. UE is not expected to process DL PRS without configuration of measurement gap.

One rationale for the specification of the above behaviour was that PRS resources do not always reside in a UE's active downlink bandwidth part (DL BWP). The UE bandwidth part is conventionally configured with communication in mind and for complexity and power saving considerations, and hence a UE DL BWP does not always span the whole downlink bandwidth. On the other hand, gNBs will in all likelihood configure the PRS with the largest available bandwidth to enable precise measurements.

Another reason for using measurement gap is to avoid interference/collision with DL data channels and other DL reference signals. DL PRS is received by the UE across multiple TRPs, which can be serving or neighboring TRPs. The data channels are scheduled by the serving cell scheduler which is generally unaware of the PRS transmission patterns for the neighbouring gNBs (consisting of one or more TRPs). Thus, to measure neighbor TRPs' PRSs, reception of the downlink traffic in the serving cell must be interrupted via measurement gaps.

The use case scenarios in NR Release 17 include indoor factory positioning, where a multi-TRP architecture with a single DU (and thus, a single scheduler) steering several TRPs is a realistic possibility. In this case, the gNB could have full control of all the TRPs that transmit DL PRSs in the deployment and therefore could schedule data traffic and positioning in the same BWP without the need of measurement gap while still maintaining control on how to handle potential collisions. Therefore, the case of gap-less measurement for PRS based measurement should be supported. The gap-less measurement for DL PRS may provide some latency reduction as the UE can perform the DL PRS measurements in the active DL BWP without having to rely on the measurement gaps.

In order to avoid collision between data and a PRS, the TRP transmitting the DL PRS must be under control of the scheduler (e.g. the TRP transmitting the DL PRS must be under a serving cell). This is the case for any of the UEs serving cell, i.e. any cells where the UE could expect data traffic via scheduling in single carrier, carrier aggregation, or multi-TRP operation. The UE maintains a list of serving cells for all of the aforementioned data transmission scenarios, and in all the scenarios, the scheduler controls the serving cells.

- In single carrier, the scheduler controls the cell the UE is connected to.
- In carrier aggregation, the scheduler controls the primary serving cell as well as the secondary serving cells.
- In multi-TRP, the scheduler operates a single serving cell across multiple TRP locations.

In one embodiment, the UE can identify the cell from which the DL PRS is originating from as a serving cell if the configured Cell ID in the PRS configuration corresponds to one of the UE serving cells.

In one embodiment, the UE can declare separate capability for downlink PRS processing for:

- Measurements performed with measurement gaps
- Measurement performed on DL PRS from a serving cell without measurements gaps Hence, processing of DL PRS at the UE without measurement gaps is only allowed if that DL PRS is transmitted by a TRP that belongs to one of the serving cells of the UE.

In one embodiment, the existing UE behaviour can be extended as follows. The UE is expected to measure the DL PRS resource outside the active DL BWP or with a numerology different from the numerology of the active DL BWP or when the DL PRS is transmitted from a non-serving cell if the measurement is made during a configured measurement gap. When the UE is expected to measure the DL PRS resource outside the active DL BWP it may request a measurement gap via higher layer parameter NR-PRS-MeasurementInfoList [TS 38.331].

Further, a UE can signal a capability for processing DL PRS transmitted from a serving cell without configuration of measurement gap(s). If the UE signals this capability and if the UE is configured by the gNB, the UE can process DL PRS without configuration of measurement gap in its active DL BWP.

PRS Dropping Rules when Collision with Other Signals and Channel Occurs

In a scenario where gapless measurements of DL PRS is allowed when the DL PRS is transmitted by a TRP belonging to a serving cell of the UE, collisions between DL PRS and the following channels/signals may in some embodiments be avoided by scheduling:

- dynamically scheduled PDSCH (PDSCH with dynamic grant scheduled via a DL DCI scrambled with C-RNTI)
- PDCCH
- PT-RS
- Aperiodic CSI-RS However, it may not be always possible to avoid collision between the above channels/signals in all cases. In some embodiments, a priority index may be configured/signaled/indicated for one or more of the above channels/signals with respect to DL PRS reception in case of collision.

In one embodiment, a priority indicator field can be introduced in the DL DCI (e.g. either DL DCI format 1_1 or DL DCI format 1_2) to indicate the priority of dynamically scheduled PDSCH with respect to a colliding DL PRS. For instance, the priority indicator field can contain a single bit. If the priority indicator bit indicates a first value (e.g. "1"), then the reception of dynamically scheduled PDSCH is prioritized over the reception/processing of a colliding DL PRS. In this case, the UE would receive/process the PDSCH and drop the instance of the colliding DL PRS. If the priority indicator bit indicates a second value (e.g. "0"), then the reception of the colliding DL PRS is prioritized and the UE does not receive/process the PDSCH. This embodiment is potentially beneficial as it allows for handling the following two use scenarios:

- a positioning measurement on DL PRS may be time-critical in some use cases (e.g. time critical positioning in indoor factory scenarios) over reception of PDSCH carrying eMBB (enhanced mobile broadband) data; and/or
- a PDSCH carrying URLLC (ultra-reliable low latency communication) data may be higher priority than a positioning measurement on DL PRS.

In another embodiment, a higher layer parameter (e.g. a RRC parameter) can be configured per PDSCH-Config information element (IE) as per 3GPP TS 38.331 v 16.4.1 to indicate the priority of PDSCH over a colliding DL PRS. If the higher layer parameter indicates a first value (e.g. "1"), then the reception of dynamically scheduled PDSCH is prioritized over the reception/processing of a colliding DL PRS. In this case, the UE would receive/process the PDSCH and drop the instance of the colliding DL PRS. If the higher layer parameter indicates a second value (e.g. "0"), then the reception of the colliding DL PRS is prioritized and the UE does not receive/process the PDSCH. One potential benefit of this embodiment is that it does not require a new bit field to be added in DL DCI, thus saving DL DCI overhead.

If the PDSCH is a downlink semi-persistent transmission configured by the SPS-Config information element in 3GPP TS 38.331 v 16.4.1, then in one embodiment, a higher layer parameter (e.g. RRC parameter) can be configured per SPS-Config information element to indicate the priority of SPS (semi-persistently scheduled) PDSCH over a colliding DL PRS. In this case, the UE would receive/process the SPS PDSCH and drop the instance of the colliding DL PRS. If the higher layer parameter indicates a second value (e.g. "0"), then the reception of the colliding DL PRS is prioritized and the UE does not receive/process the colliding instance of the SPS PDSCH. Note that in NR, it is possible to configure multiple downlink SPS PDSCH configurations with different SPS configuration indices (i.e. SPS-ConfigIndex-r16 in 3GPP TS 38.331 v 16.4.1). In a variant of this embodiment, the higher layer parameter to indicate priority of SPS PDSCH over a colliding DL PRS can be configured per SPS configuration, when there are multiple SPS configurations. With this embodiment, a subset of the multiple SPS configurations may be configured with the higher layer parameter indicating that SPS PDSCH reception is prioritized over a colliding DL PRS, while another subset of the multiple SPS configurations may be configured with the higher layer parameter indicating that a colliding DL PRS is prioritized over the SPS PDSCH reception. Hence, with this embodiment, it is possible to have SPS PDSCH reception prioritized over colliding DL PRS in some SPS configurations and colliding DL PRS prioritized over SPS reception in other SPS configurations.

In another embodiment, a priority indicator field can be included in the DL DCI that activates an SPS configuration (i.e. a DL DCI scrambled by CS-RNTI). The priority indicator field may be a new field introduced in the DL DCI or a reserved field in a DL DCI scrambled by CS-RNTI. For instance, the priority indicator field may contain a single bit. If the priority indicator bit indicates a first value (e.g. "1"), then the reception of SPS PDSCH is prioritized over the reception/processing of a colliding DL PRS. In this case, the UE would receive/process the SPS PDSCH and drop the instance of the colliding DL PRS. If the priority indicator bit indicates a second value (e.g. "0"), then the reception of the colliding DL PRS is prioritized and the UE does not receive/process the colliding instance of SPS PDSCH.

Note that as PT-RS is generally transmitted in the PRBs in which PDSCH is scheduled, collision between PT-RS and DL PRS can be handled by the mechanisms for handling collision between PDSCH and DL PRS.

In another embodiment, to handle collisions between DL PRS and CSI-RS (i.e. non-zero power CSI-RS or NZP CSI-RS), a higher layer priority parameter (e.g. RRC parameter) can be configured from the gNB to the UE per NZP-(SI-RS-Resource information element in 3GPP TS 38.331 v 16.4.1 to indicate the priority of NZP CSI-RS over a colliding DL PRS. It is assumed that the priority parameter can be configured in the NZP-CSI-RS-Resource configuration which has a resource ID given by nzp-(SI-RS-ResourceId. If the priority parameter indicates a first value (e.g. “1”), then the reception of a NZP CSI-RS resource in that NZP-CSI-RS-Resource is prioritized over DL PRS when a NZP CSI-RS is transmitted in that resource. In this case, the DL PRS will not be receive/prioritized by the UE. If the priority parameter indicates a second value (e.g. “0”), then the reception of a DL PRS which collides with a NZP CSI-RS transmitted in the NZP-CSI-RS-Resource is prioritized and the UE will receive/process the colliding DL PRS. With this embodiment, a subset of the NZP-CSI-RS resource configurations can be configured with the higher layer parameter indicating that NZP-CSI-RS reception is prioritized over a colliding DL PRS, while another subset of the NZP-CSI-RS configurations can be configured with the higher layer parameter indicating that a colliding DL PRS is prioritized over the NZP CSI-RS reception. Hence, with this embodiment, it is possible to have NZP CSI-RS reception prioritized over colliding DL PRS in some NZP CSI-RS configurations and colliding DL PRS prioritized over NZP CSI-RS reception in some other NZP CSI-RS configurations. This is potentially beneficial to allows for:

- a NZP CSI-RS with higher priority to be received when it collides with DL PRS, and/or
- another NZP CSI-RS with lower priority to be dropped when it collides with DL PRS.

In another embodiment, collision handling between DL PRS and NZP CSI-RS can be handled by higher layer configuring a priority indicator parameter in the NZP-(SI-RS-ResourceSet information element in 3GPP TS 38.331 v 16.4.1 to indicate the priority of NZP CSI-RS over a colliding DL PRS. As the NZP-CSI-RS-ResourceSet configuration may include multiple NZP CSI-RS resources, the priority configured by the higher layer configuration parameter applies to all the NZP CSI-RS resources configured in the NZP-CSI-RS-ResourceSet. It is assumed that the priority parameter is configured in the NZP-(SI-RS-ResourceSet configuration which has a resource set ID given by NZP-CSI-RS-ResourceId. If the priority parameter indicates a first value (e.g. “1”), then the reception a NZP CSI-RS in any one the NZP CSI-RS resources in that NZP-CSI-RS-ResourceSet is prioritized over a colliding DL PRS when a NZP CSI-RS is transmitted in any one of those NZP CSI-RS resources. In this case, the colliding DL PRS will not be receive/processed by the UE. If the priority parameter indicates a second value (e.g. “0”), then the reception of a DL PRS which collides with a NZP CSI-RS transmitted in any one the NZP CSI-RS resources in that NZP-CSI-RS-ResourceSet is prioritized and the UE will receive/process the colliding DL PRS. With this embodiment, a subset of the NZP-(SI-RS-ResourceSet configurations can be configured with the higher layer parameter indicating that NZP-CSI-RS reception is prioritized over a colliding DL PRS while another subset of the NZP-CSI-RS-ResourceSet configurations can be configured with the higher layer parameter indicating that a colliding DL PRS is prioritized over the NZP CSI-RS reception. Hence, with this embodiment, it is possible to have NZP CSI-RS reception prioritized over colliding DL PRS in some NZP-CSI-RS-ResourceSet configurations and colliding DL PRS prioritized over NZP CSI-RS reception in some other NZP-CSI-RS-ResourceSet configurations. This is potentially beneficial to allow for:

- a group of NZP CSI-RSs transmitted in NZP CSI-RS resources configured in the NZP-CSI-RS-ResourceSet with higher priority to be received when it collides with DL PRS, and/or
- another group of NZP CSI-RSs transmitted in NZP CSI-RS resources configured in the NZP-CSI-RS-ResourceSet with lower priority to be dropped when it collides with DL PRS.

Note that in yet another embodiment, collision handling between DL PRS and NZP CSI-RS can be handled by higher layer configuring a priority indicator parameter in the (SI-ResourceConfig information element in 3GPP TS 38.331 v 16.4.1 to indicate the priority of NZP CSI-RS over a colliding DL PRS. The priority handling is similar to the above embodiment except that the priority configured by the higher layer configured priority indicator parameter can apply to the multiple NZP CSI-RS resource sets configured in the ('SI-ResourceConfig.

In another embodiment, to handle collision between aperiodically transmitted NZP CSI-RS (e.g. aperiodic CSI-RS) and DL PRS, a priority indicator parameter can be higher layer configured as part of the ('SI-Aperiodic TriggerStateList information element in 3GPP TS 38.331 v 16.4.1 to indicate the priority of aperiodic NZP CSI-RS over a colliding DL PRS as shown below. Hence, different priority indicator values can be set for different aperiodic NZP CSI-RS to handle collision with DL PRS. In the example below, when a codepoint in the CSI Request field in an uplink DCI (e.g. a DCI with DCI formats 0_0, 0_1, or 0_2 as defined in 3GPP TS 38.212) triggers an CSI-Aperiodic TriggerState, then the aperiodic NZP CSI-RSs in the list associatedReportConfigInfoList configured in that (SI-Aperiodic TriggerState are triggered. If the priority parameter indicates a first value (e.g. “1” or enabled), then the reception the aperiodic NZP CSI-RS in any one the NZP CSI-RS resources in the NZP-(SI-RS-ResourceSet given by ‘resourceSet’ is prioritized over a colliding DL PRS. In this case, the colliding DL PRS will not be receive/processed by the UE. If the priority parameter indicates a second value (e.g. “0”) or if the priority parameter is not configured (e.g. not configured in the (SI-AssociatedReportConfigInfo), then the reception of a DL PRS which collides with a NZP CSI-RS transmitted in any one the NZP CSI-RS resources in the NZP-(SI-RS-ResourceSet given by ‘resourceSet’ is prioritized and the UE will receive/process the colliding DL PRS. With this embodiment, the NZP-(SI-RS-ResourceSets (given by ‘resourceSet’) configured in a subset of CSI-Aperiodic TriggerStates can be configured with a higher priority than DL PRS, while the NZP-CSI-RS-ResourceSets (given by ‘resourceSet’) configured in another subset of CSI-AperiodicTriggerStates can be configured with a lower priority than DL PRS.

The CSI-AperiodicTriggerStateList IE can be extended to include a DL PRS priority indicator field/parameter as discussed herein.

```
-- ASN1START
-- TAG-CSI-APERIODICTRIGGERSTATELIST-START
CSI-AperiodicTriggerStateList ::=                SEQUENCE (SIZE (1..maxNrOfCSI-
AperiodicTriggers)) OF CSI-AperiodicTriggerState
CSI-AperiodicTriggerState ::=                    SEQUENCE {
   associatedReportConfigInfoList                 SEQUENCE
(SIZE(1..maxNrofReportConfigPerAperiodicTrigger)) OF CSI-
AssociatedReportConfigInfo,
   ...
}
CSI-AssociatedReportConfigInfo ::=               SEQUENCE {
   reportConfigId                                 CSI-ReportConfigId,
   resourcesForChannel                            CHOICE {
     nzp-CSI-RS                                     SEQUENCE {
       resourceSet                                    INTEGER (1..maxNrofNZP-CSI-
RS-ResourceSetsPerConfig),
       qcl-info                                       SEQUENCE (SIZE(1..maxNrofAP-
CSI-RS-ResourcesPerSet)) OF TCI-StateId
OPTIONAL -- Cond Aperiodic
     },
     csi-SSB-ResourceSet                            INTEGER (1..maxNrofCSI-SSB-
ResourceSetsPerConfig)
   },
   csi-IM-ResourcesForInterference                INTEGER(1..maxNrofCSI-IM-
ResourceSetsPerConfig)                           OPTIONAL, -- Cond CSI-IM-ForInterference
   nzp-CSI-RS-ResourcesForInterference            INTEGER (1..maxNrofNZP-CSI-RS-
ResourceSetsPerConfig)                         OPTIONAL, -- Cond NZP-CSI-RS-ForInterference
   ...
  [[
  DL-PRS-priority-indicator-r17                      ENUMERATED {true}
        OPTIONAL -- Cond Aperiodic
  ]]
}
-- TAG-CSI-APERIODICTRIGGERSTATELIST-STOP
-- ASN1STOP
```

In another embodiment, to handle collision between semi-persistently transmitted NZP CSI-RS (e.g. semi-persistent CSI-RS) and DL PRS, a priority indicator parameter may be included in the MAC CE that is used to activate the semi-persistent NZP CSI-RS (i.e. the MAC CE in Section 6.1.3.12 of 3GPP TS 38.321 v 16.4.1) to indicate the priority of semi-persistent NZP CSI-RS over a colliding DL PRS. In some embodiments, the priority indicator parameter is a field in the MAC CE that activates the semi-persistent NZP CSI-RS. Hence, different priority indicator values can be indicated in the MAC CE when the semi-persistent NZP CSI-RS is being activated to handle collision with DL PRS. For instance, when a semi-persistent NZP CSI-RS is being activated via a first MAC CE and the priority indicator is set to a first value (e.g. “1”), then the reception the semi-persistent NZP CSI-RS in any one the NZP CSI-RS resources in the ‘SP CSI-RS resource set ID’ in the MAC CE of Section 6.1.3.12 of 3GPP TS 38.321 v 16.4.1 is prioritized over a colliding DL PRS. After a few transmission periods, the semi-persistent NZP CSI-RS may be deactivated. When the semi-persistent NZP CSI-RS is being activated again using a second MAC CE and the priority indicator is set to a second value (e.g. “0”), then the reception of the colliding DL-PRS is prioritized over the semi-persistent NZP CSI-RS in any one the NZP CSI-RS resources in the ‘SP CSI-RS resource set ID)’ in the MAC CE of Section 6.1.3.12 of 3GPP TS 38.321 v 16.4.1.

In some alternative embodiments, the priority indication (s) for the different channels/reference signals (e.g. PDSCH, CSI-RS, etc.) can be provided to the UE as part of the PRS configuration. The PRS configuration is transmitted by the network node (e.g. LMF) to the UE. The PRS configuration can include the same or different priority indicator(s) for one or more of the following channels/reference signals: dynamically scheduled PDSCH, SPS PDSCH, periodic CSI-RS, semi-persistent CSI-RS, and aperiodic CSI-RS.

Figure 5:
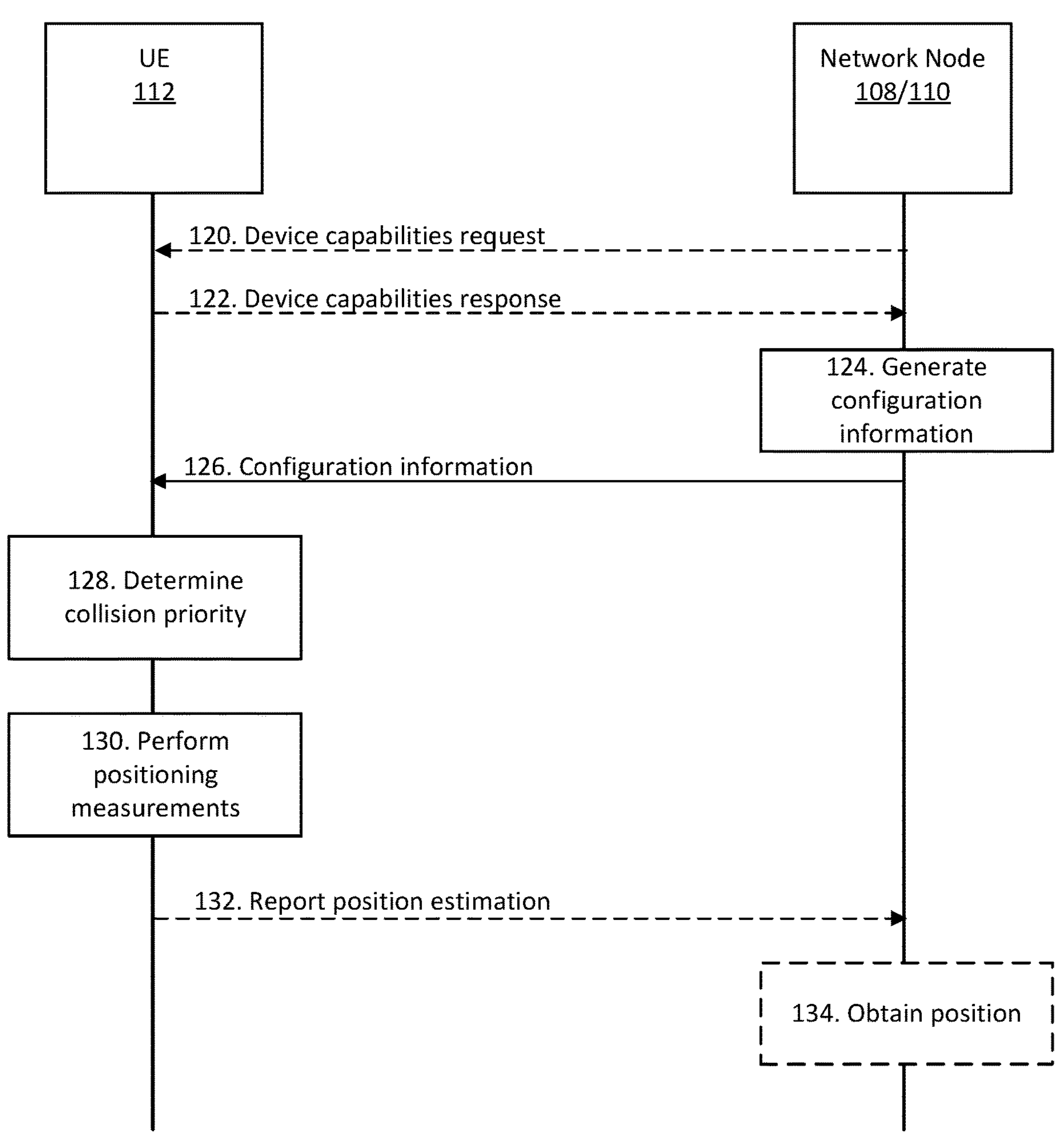
FIG. 5 is an example signaling diagram.

FIG. 5 is an example signaling diagram illustrating the basic signaling steps from the perspective of a network node (e.g. gNB 110 or location server 108) and a target device (e.g. UE 112) according to certain embodiments.

Network node 108/100 and UE 112 can exchange capabilities information (steps 120, 122). The capabilities can include the UE’s capability related to positioning functions such as performing measurements with or without a configured measurement gap. In step 124, network node 108/110 can define collision rules for the UE 112 associated with the processing of signals and/or channels that would potentially overlap/collide with the reception of one or more positioning reference signal(s). The network node can generate a configuration message including a priority indicator indicating a priority of reception/processing of a signal/channel with respect to the reception/processing of a positioning reference signal and transmit the generated configuration information to the UE 112 (step 126). The configuration information can be transmitted via RRC, MAC CE, DCI or any other appropriate control signaling.

In step 128, UE 112 determines the priority between reception/processing of a signal/channel and a PRS in accordance with the received configuration information. The UE can drop the PRS if it is not prioritized and process the other (e.g. colliding) transmission if it is prioritized. Alternatively, the UE can receive the PRS if it is prioritized and drop the other (e.g. colliding) transmission if it is not prioritized.

UE 112 can perform positioning measurements in accordance with the received configuration information and/or the capability information (step 130). In some embodiments, the UE 112 can report its estimated position and/or other associated positioning information (step 132). Network node 108/110 can receive the positioning report from the UE 112 (step 134).

It will be appreciated that some positioning-related messages (e.g. request, response, report, acknowledgement, etc.) could be mandated as part of the procedure in some implementations (e.g. not configurable), while in other implementations they can be configurable through signaling.

Figure 6:
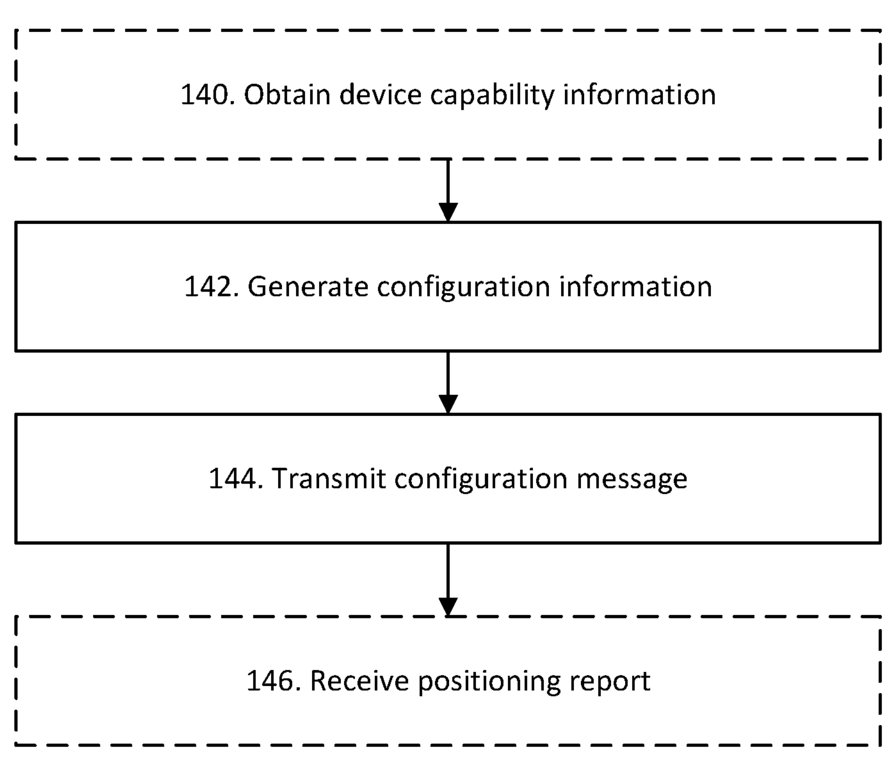
FIG. 6 is a flow chart illustrating a method which can be performed in a network node.

FIG. 6 is a flow chart illustrating a method which can be performed in a network node, such as a gNB 110 and/or a location server 108 as described herein. The method can include:

Step 140: Optionally, the network node exchanges device capability information with a wireless device. The capability information can include obtaining capabilities associated with PRS processing by the wireless device. In some embodiments, this can include an indication that the wireless device is configured to measure and/or process PRS(s) transmitted by a serving cell and/or a non-serving cell during a configured measurement gap. In some embodiments, this can include an indication that the wireless device is configured to measure and/or process PRS(s) transmitted by a serving cell and/or a non-serving cell without a configured measurement gap.

Step 142: The network node generates configuration information. The configuration information can be generated in accordance with one or more priority/collision rules associated with prioritizing the processing of reference signals, such as PRS(s), by the wireless device, when the reception overlaps or "collides" with another scheduled or non-scheduled transmission, signal and/or channel (e.g. PDSCH, PDCCH, CSI-RS, NZP CSI-RS, etc.). The network node can set a priority for the reference signal and/or the other transmission (s). In some embodiments, priority can be defined for one of more subsets of a particular signal or channel. In some embodiments, the configuration information can include PRS configuration.

Step 144: The network node transmits configuration information to the wireless device. The configuration information can include a priority indicator indicating a relative priority for receiving/processing a signal/channel with respect to a reference signal, such as a PRS. The configuration information can comprise one or more control messages such as an RRC message, a MAC CE message and/or a DCI message.

In some embodiments, the configuration information can also dynamically schedule the DL channel.

In some embodiments, the priority indicator can indicate that the PRS priority is lower than a first type of data on the DL channel, and the PRS priority is higher than a second type of data on the DL channel.

Step 146: Optionally, the network node can receive, from the wireless device, a positioning report. The positioning report can include an estimated position, positioning measurements, and/or other positioning related information. The positioning report can be based on positioning actions performed by the wireless device in accordance with the configuration information transmitted by the network node and/or the exchanged capability information.

It will be appreciated that in some embodiments, the network node can communicate (e.g. transmit/receive messages) directly with a target wireless device 112. In other embodiments, messages and signals between the entities may be communicated via other nodes, such as radio access node (e.g. gNB, eNB) 110.

It will be appreciated that one or more of the above steps can be performed simultaneously and/or in a different order. Also, steps illustrated in dashed lines are optional and can be omitted in some embodiments.

Figure 7:
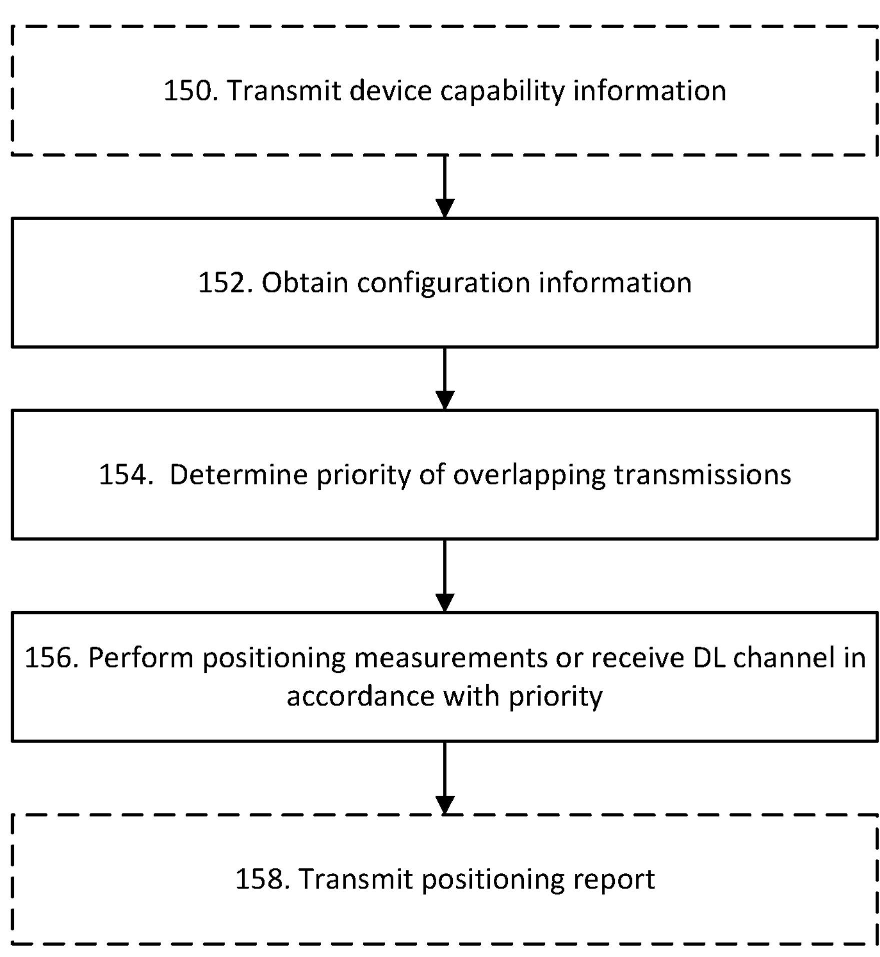
FIG. 7 is a flow chart illustrating a method which can be performed in a wireless device.

FIG. 7 is a flow chart illustrating a method which can be performed in a wireless device, such as a UE 112 as described herein. The method can include:

Step 150: Optionally, the wireless device exchanges device capability information with a network node. The capability information can include capabilities associated with PRS processing by the wireless device. In some embodiments, this can include transmitting an indication that the wireless device is configured to measure and/or process PRS(s) transmitted by a serving cell and/or a non-serving cell during a configured measurement gap. In some embodiments, this can include transmitting an indication that the wireless device is configured to measure and/or process PRS(s) transmitted by a serving cell and/or a non-serving cell without a configured measurement gap.

Step 152: The wireless device obtains configuration information. In some embodiments, this includes receiving a configuration message (e.g. an RRC message, a MAC CE message and/or a DCI message) from a network node. In some embodiments, the configuration information can be PRS configuration. The configuration information can include a priority indicator.

In some embodiments, the priority indicator indicates a priority of reception/processing of one or more transmissions/signals/channels with respect to the reception/processing of a reference signal, such as a PRS. As described in the various embodiments herein, the priority indicator can be associated with one or more of PDSCH, PDCCH, PT-RS, CSI-RS, and/or NZP CSI-RS. In some embodiments, the priority indicator can be associated with one or more groups or subsets of a particular signal or channel (e.g. a first NZP CSI-RS resource is prioritized over a PRS, but a second NZP CSI-RS resource is not). In some embodiments, the priority indicator can indicate that the PRS priority is lower than a first type of data on the DL channel, and the PRS priority is higher than a second type of data on the DL channel.

The priority indicator can be carried by one or more of the messages or information elements described in the various embodiments herein.

In some embodiments, the configuration information can also dynamically schedule the DL channel.

Step 154: The wireless device determines a priority associated with a reference signal, such as a PRS, and an overlapping DL channel transmission, such as a scheduled (or non-scheduled) transmission, signal and/or channel (e.g. PDSCH, PDCCH, CSI-RS, NZP CSI-RS, etc.). The priority can be determined in accordance with the priority indicator in the received configuration information. The transmissions can be overlapping in time and/or frequency resources.

Step 156: The wireless device can perform positioning measurements or receive the DL channel transmission in accordance with the determined priority.

In response to determining that a PRS is prioritized over the DL signal/channel (e.g. the PRS priority is higher), the wireless device can receive, measure and/or process the PRS and drop, ignore and/or not process the other DL transmission. In response to determining the other DL signal/channel is prioritized over a PRS (e.g. the PRS priority is lower), the wireless device can receive and/or process the other transmission and drop, ignore and/or not process the PRS.

In some embodiments, the wireless device determines an estimated position of the wireless device in accordance with the positioning measurements.

Step 158: Optionally, the wireless device can transmit, to a network node, a positioning report. The positioning report can include an estimated position, positioning measurements, and/or other positioning related information. The positioning report can be based on positioning actions performed by the wireless device in accordance with the configuration information transmitted by the network node and/or the exchanged capability information.

In some embodiments, the wireless device can transmit the estimated position of the wireless device.

It will be appreciated that in some embodiments, the wireless device can communicate (e.g. transmit/receive messages) directly with a network node such as location server 108. In other embodiments, messages and signals between the entities may be communicated via other nodes, such as radio access node (e.g. gNB, eNB) 110.

It will be appreciated that one or more of the above steps can be performed simultaneously and/or in a different order. Also, steps illustrated in dashed lines are optional and can be omitted in some embodiments.

Figure 8:
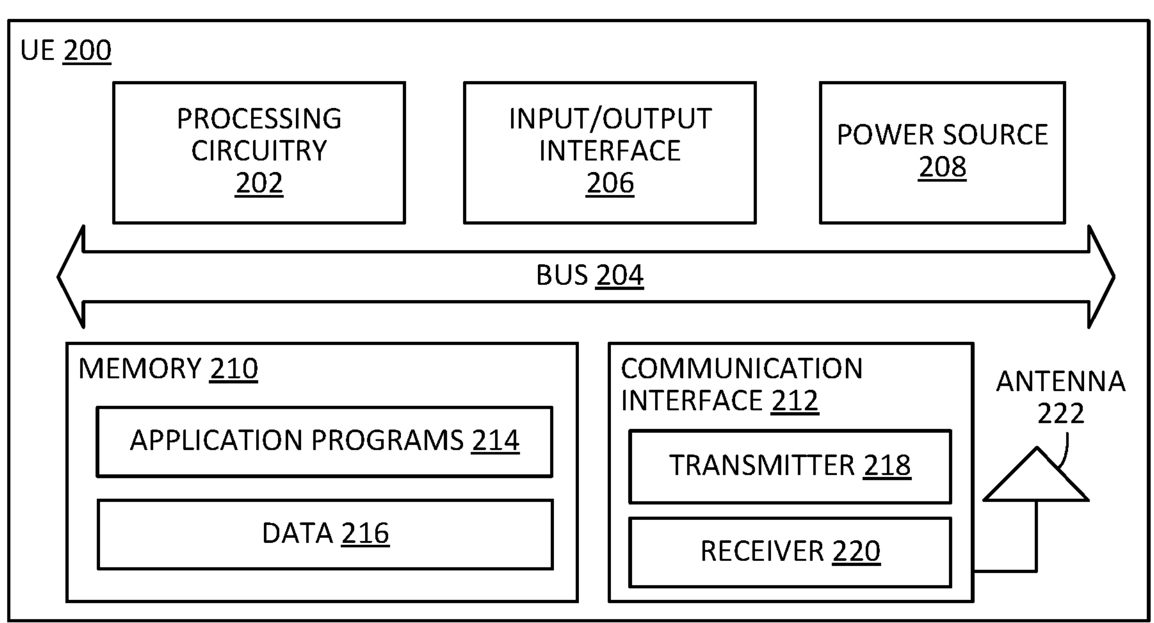
FIG. 8 is a block diagram of an example wireless device.

FIG. 8 shows a UE 200, which may be an embodiment of the UE 112 of FIG. 4 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 200 includes processing circuitry 202 that is operatively coupled via a bus 204 to an input/output interface 206, a power source 208, a memory 210, a communication interface 212, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry 202 is configured to process instructions and data and may be configured to implement any sequential state machine operative to execute instructions stored as machine-readable computer programs in the memory 210. The processing circuitry 202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 202 may include multiple central processing units (CPUs).

In the example, the input/output interface 206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 208 is structured as a battery or battery pack. Other types of power sources, such as an external power source (e.g., an electricity outlet), photovoltaic device, or power cell, may be used. The power source 208 may further include power circuitry for delivering power from the power source 208 itself, and/or an external power source, to the various parts of the UE 200 via input circuitry or an interface such as an electrical power cable. Delivering power may be, for example, for charging of the power source 208. Power circuitry may perform any formatting, converting, or other modification to the power from the power source 208 to make the power suitable for the respective components of the UE 200 to which power is supplied.

The memory 210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 210 includes one or more application programs 214, such as an operating system, web browser application, a widget, gadget engine, or other application, and corresponding data 216. The memory 210 may store, for use by the UE 200, any of a variety of various operating systems or combinations of operating systems.

The memory 210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 210 may allow the UE 200 to access instructions, application programs and the like, stored on transitory or non-transitory memory media, to off-load data, or to upload data. An article of manufacture, such as one utilizing a communication system may be tangibly embodied as or in the memory 210, which may be or comprise a device-readable storage medium.

The processing circuitry 202 may be configured to communicate with an access network or other network using the communication interface 212. The communication interface 212 may comprise one or more communication subsystems and may include or be communicatively coupled to an antenna 222. The communication interface 212 may include one or more transceivers used to communicate, such as by communicating with one or more remote transceivers of another device capable of wireless communication (e.g., another UE or a network node in an access network). Each transceiver may include a transmitter 218 and/or a receiver 220 appropriate to provide network communications (e.g., optical, electrical, frequency allocations, and so forth). Moreover, the transmitter 218 and receiver 220 may be coupled to one or more antennas (e.g., antenna 222) and may share circuit components, software or firmware, or alternatively be implemented separately.

In the illustrated embodiment, communication functions of the communication interface 212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 200 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
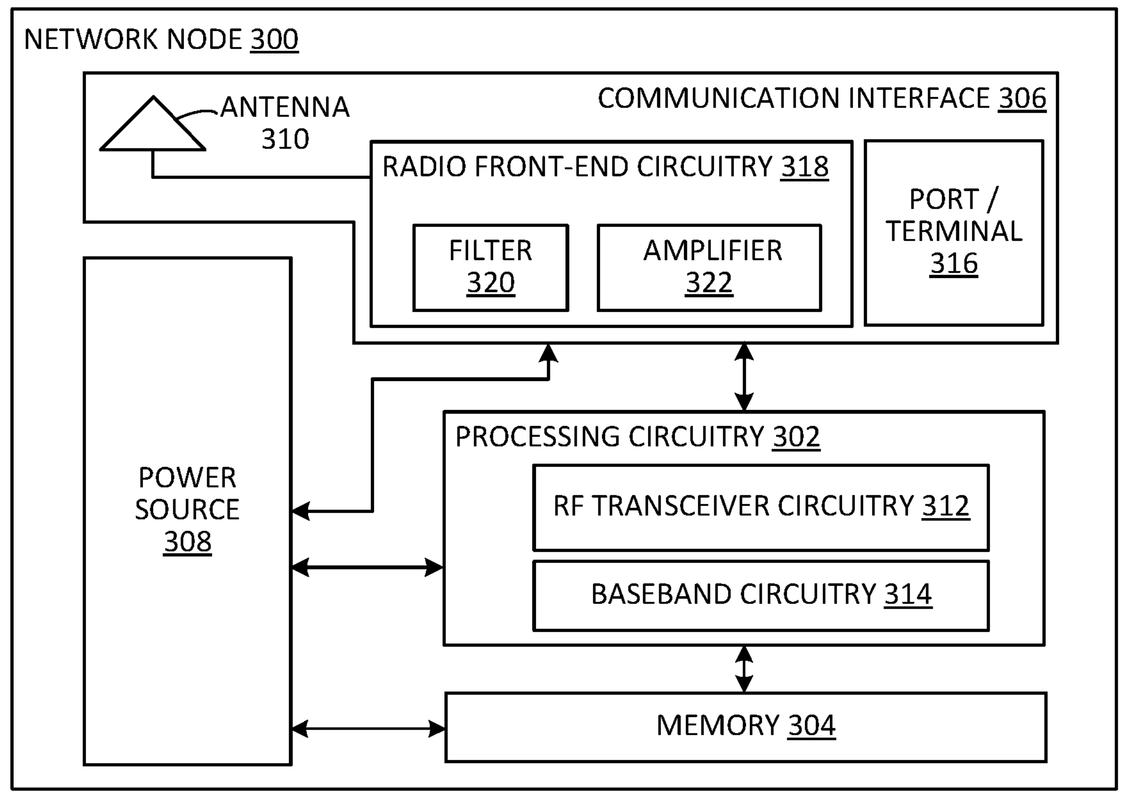
FIG. 9 is a block diagram of an example network node.

FIG. 9 shows a network node 300, which may be an embodiment of the access node 110 or the core network node 108 of FIG. 4, in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 300 includes a processing circuitry 302, a memory 304, a communication interface 306, and a power source 308. The network node 300 may be composed of multiple physically separate components (e.g., a NodeB component and a RNC component, or a BTS component and a BSC component, etc.), which may each have their own respective components. In certain scenarios in which the network node 300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 300 may be configured to support multiple radio access technologies (RATs). In such embodiments, some components may be duplicated (e.g., separate memory 304 for different RATs) and some components may be reused (e.g., a same antenna 310 may be shared by different RATs). The network node 300 may also include multiple sets of the various illustrated components for different wireless technologies integrated into network node 300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 300.

The processing circuitry 302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 300 components, such as the memory 304, to provide network node 300 functionality.

In some embodiments, the processing circuitry 302 includes a system on a chip (SOC). In some embodiments, the processing circuitry 302 includes one or more of radio frequency (RF) transceiver circuitry 312 and baseband processing circuitry 314. In some embodiments, the radio frequency (RF) transceiver circuitry 312 and the baseband processing circuitry 314 may be on separate chips (or sets of chips), boards, or units, such as radio units and digital units. In alternative embodiments, part or all of RF transceiver circuitry 312 and baseband processing circuitry 314 may be on the same chip or set of chips, boards, or units.

The memory 304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 302. The memory 304 may store any suitable instructions, data, or information, including a computer program, software, an application including one or more of logic, rules, code, tables, and/or other instructions capable of being executed by the processing circuitry 302 and utilized by the network node 300. The memory 304 may be used to store any calculations made by the processing circuitry 302 and/or any data received via the communication interface 306. In some embodiments, the processing circuitry 302 and memory 304 is integrated.

The communication interface 306 is used in wired or wireless communication of signaling and/or data between a network node, access network, and/or UE. As illustrated, the communication interface 306 comprises port(s)/terminal(s) 316 to send and receive data, for example to and from a network over a wired connection. The communication interface 306 also includes radio front-end circuitry 318 that may be coupled to, or in certain embodiments a part of, the antenna 310. Radio front-end circuitry 318 comprises filters 320 and amplifiers 322. The radio front-end circuitry 318 may be connected to an antenna 310 and processing circuitry 302. The radio front-end circuitry may be configured to condition signals communicated between antenna 310 and processing circuitry 302. The radio front-end circuitry 318 may receive digital data that is to be sent out to other network nodes or UEs via a wireless connection. The radio front-end circuitry 318 may convert the digital data into a radio signal having the appropriate channel and bandwidth parameters using a combination of filters 320 and/or amplifiers 322. The radio signal may then be transmitted via the antenna 310. Similarly, when receiving data, the antenna 310 may collect radio signals which are then converted into digital data by the radio front-end circuitry 318. The digital data may be passed to the processing circuitry 302. In other embodiments, the communication interface may comprise different components and/or different combinations of components.

In certain alternative embodiments, the network node 300 does not include separate radio front-end circuitry 318, instead, the processing circuitry 302 includes radio front-end circuitry and is connected to the antenna 310. Similarly, in some embodiments, all or some of the RF transceiver circuitry 312 is part of the communication interface 306. In still other embodiments, the communication interface 306 includes one or more ports or terminals 316, the radio front-end circuitry 318, and the RF transceiver circuitry 312, as part of a radio unit (not shown), and the communication interface 306 communicates with the baseband processing circuitry 314, which is part of a digital unit (not shown).

The antenna 310 may include one or more antennas, or antenna arrays, configured to send and/or receive wireless signals. The antenna 310 may be coupled to the radio front-end circuitry 318 and may be any type of antenna capable of transmitting and receiving data and/or signals wirelessly. In certain embodiments, the antenna 310 is separate from the network node 300 and connectable to the network node 300 through an interface or port.

The antenna 310, communication interface 306, and/or the processing circuitry 302 may be configured to perform any receiving operations and/or certain obtaining operations described herein as being performed by the network node. Any information, data and/or signals may be received from a UE, another network node and/or any other network equipment. Similarly, the antenna 310, the communication interface 306, and/or the processing circuitry 302 may be configured to perform any transmitting operations described herein as being performed by the network node. Any information, data and/or signals may be transmitted to a UE, another network node and/or any other network equipment.

The power source 308 provides power to the various components of network node 300 in a form suitable for the respective components (e.g., at a voltage and current level needed for each respective component). The power source 308 may further comprise, or be coupled to, power management circuitry to supply the components of the network node 300 with power for performing the functionality described herein. For example, the network node 300 may be connectable to an external power source (e.g., the power grid, an electricity outlet) via an input circuitry or interface such as an electrical cable, whereby the external power source supplies power to power circuitry of the power source 308. As a further example, the power source 308 may comprise a source of power in the form of a battery or battery pack which is connected to, or integrated in, power circuitry. The battery may provide backup power should the external power source fail.

Embodiments of the network node 300 may include additional components beyond those shown in FIG. 9 for providing certain aspects of the network node's functionality, including any of the functionality described herein and/or any functionality necessary to support the subject matter described herein. For example, the network node 300 may include user interface equipment to allow input of information into the network node 300 and to allow output of information from the network node 300. This may allow a user to perform diagnostic, maintenance, repair, and other administrative functions for the network node 300.

Figure 10:
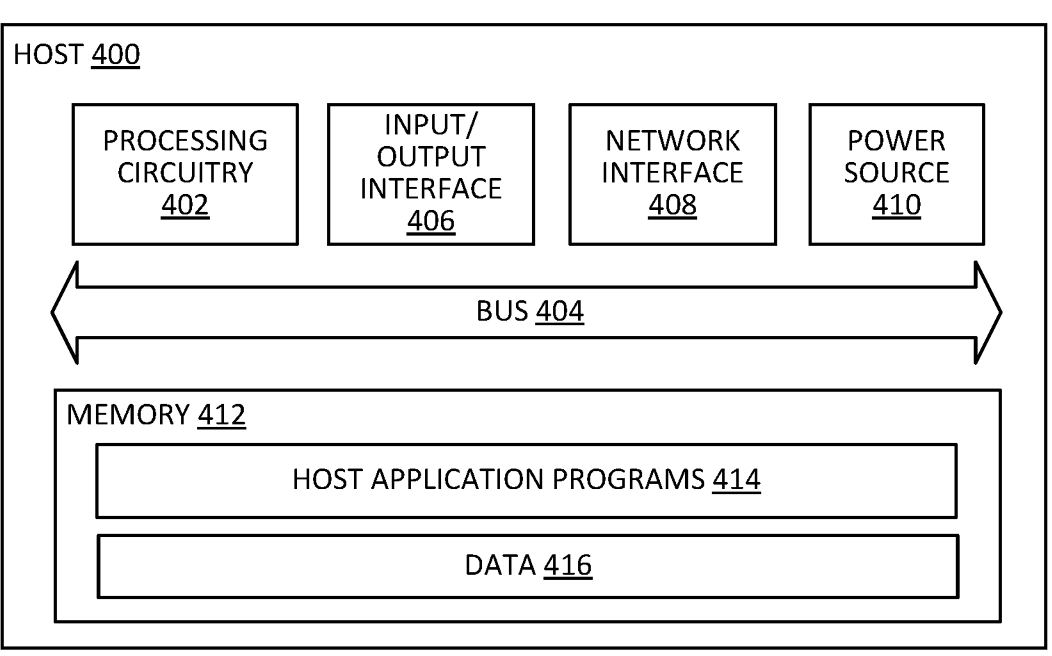
FIG. 10 is a block diagram of an example host.

FIG. 10 is a block diagram of a host 400, which may be an embodiment of the host 116 of FIG. 4, in accordance with various aspects described herein. As used herein, the host 400 may be or comprise various combinations hardware and/or software, including a standalone server, a blade server, a cloud-implemented server, a distributed server, a virtual machine, container, or processing resources in a server farm. The host 400 may provide one or more services to one or more UEs.

The host 400 includes processing circuitry 402 that is operatively coupled via a bus 404 to an input/output interface 406, a network interface 408, a power source 410, and a memory 412. Other components may be included in other embodiments. Features of these components may be substantially similar to those described with respect to the devices of previous figures, such as FIGS. 8 and 9, such that the descriptions thereof are generally applicable to the corresponding components of host 400.

The memory 412 may include one or more computer programs including one or more host application programs 414 and data 416, which may include user data, e.g., data generated by a UE for the host 400 or data generated by the host 400 for a UE. Embodiments of the host 400 may utilize only a subset or all of the components shown. The host application programs 414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 414 may also provide for user authentication and licensing checks and may periodically report health, routes, and content availability to a central node, such as a device in or on the edge of a core network. Accordingly, the host 400 may select and/or indicate a different host for over-the-top services for a UE. The host application programs 414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
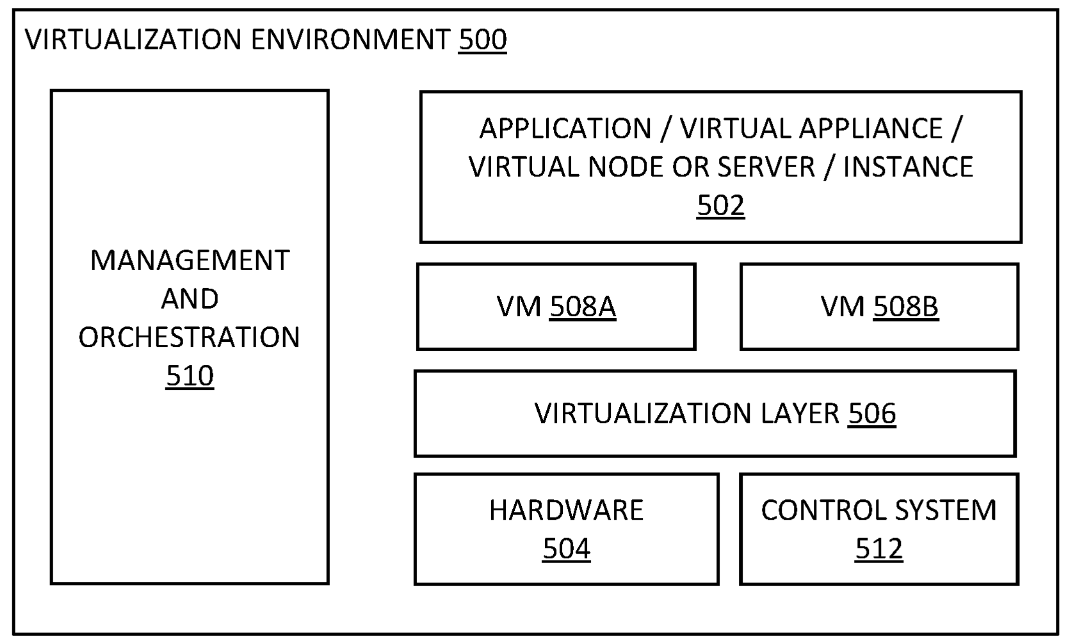
FIG. 11 is a block diagram illustrating an example virtualization environment.

FIG. 11 is a block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 502 (which may alternatively be called software instances, virtual appliances, network functions, virtual nodes, virtual network functions, etc.) are run in the virtualization environment 500 to implement some of the features, functions, and/or benefits of some of the embodiments disclosed herein.

Hardware 504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 506 (also referred to as hypervisors or virtual machine monitors (VMMs)), provide VMs 508*a* and 508*b* (one or more of which may be generally referred to as VMs 508), and/or perform any of the functions, features and/or benefits described in relation with some embodiments described herein. The virtualization layer 506 may present a virtual operating platform that appears like networking hardware to the VMs 508.

The VMs 508 comprise virtual processing, virtual memory, virtual networking or interface and virtual storage, and may be run by a corresponding virtualization layer 506. Different embodiments of the instance of a virtual appliance 502 may be implemented on one or more of VMs 508, and the implementations may be made in different ways. Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, a VM 508 may be a software implementation of a physical machine that runs programs as if they were executing on a physical, non-virtualized machine. Each of the VMs 508, and that part of hardware 504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 508 on top of the hardware 504 and corresponds to the application 502.

Hardware 504 may be implemented in a standalone network node with generic or specific components. Hardware 504 may implement some functions via virtualization. Alternatively, hardware 504 may be part of a larger cluster of hardware (e.g. such as in a data center or CPE) where many hardware nodes work together and are managed via management and orchestration 510, which, among others, oversees lifecycle management of applications 502. In some embodiments, hardware 504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 512 which may alternatively be used for communication between hardware nodes and radio units.

Figure 12:
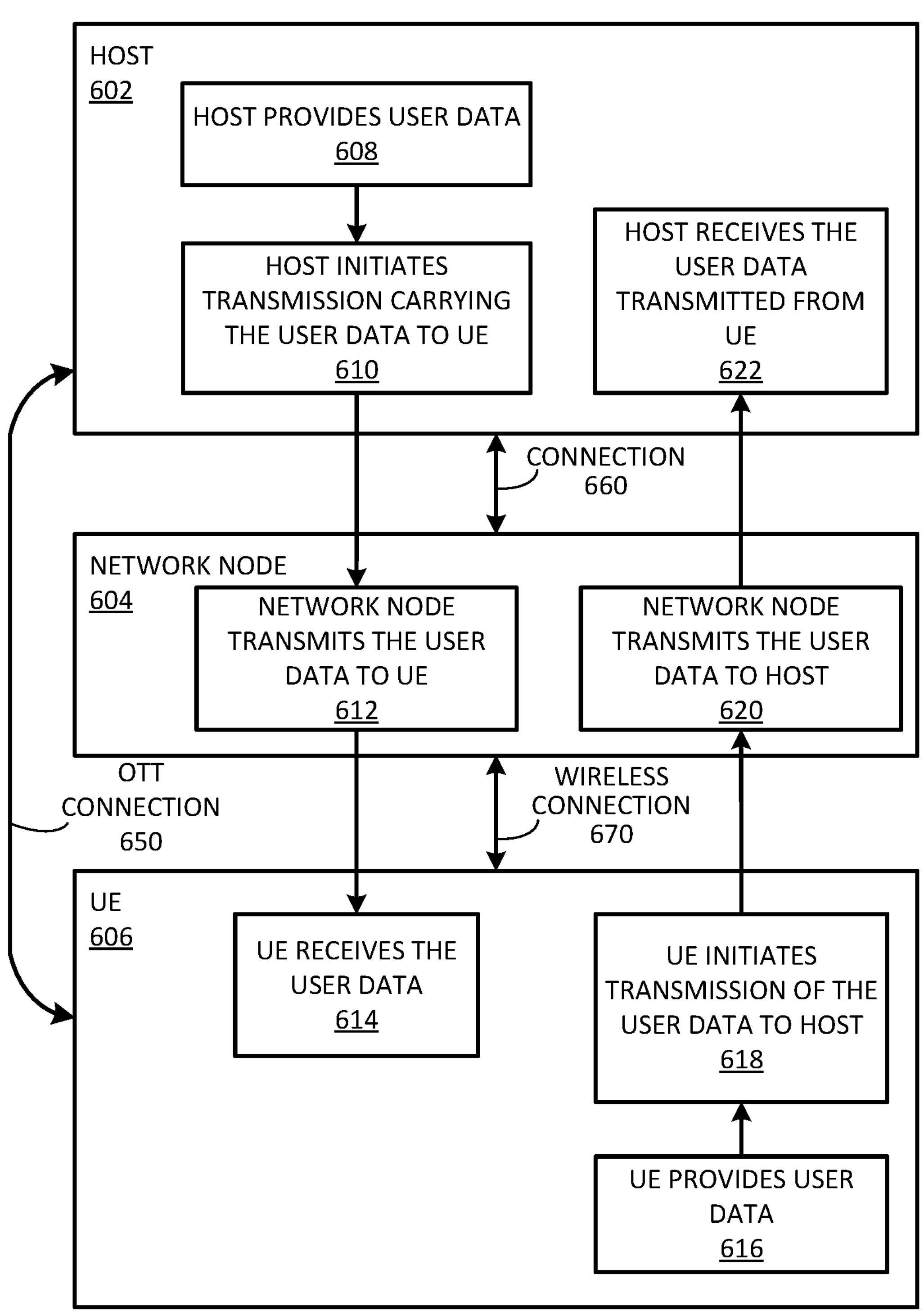
FIG. 12 is a communication diagram of a host communicating via a network node with a UE.

FIG. 12 shows a communication diagram of a host 602 communicating via a network node 604 with a UE 606 over a partially wireless connection in accordance with some embodiments. Example implementations, in accordance with various embodiments, of the UE (such as a UE 112A of FIG. 4 and/or UE 200 of FIG. 8), network node (such as network node 110A of FIG. 4 and/or network node 300 of FIG. 9), and host (such as host 116 of FIG. 4 and/or host 400 of FIG. 10) discussed in the preceding paragraphs will now be described with reference to FIG. 12.

Like host 400, embodiments of host 602 include hardware, such as a communication interface, processing circuitry, and memory. The host 602 also includes software, which is stored in or accessible by the host 602 and executable by the processing circuitry. The software includes a host application that may be operable to provide a service to a remote user, such as the UE 606 connecting via an over-the-top (OTT) connection 650 extending between the UE 606 and host 602. In providing the service to the remote user, a host application may provide user data which is transmitted using the OTT connection 650.

The network node 604 includes hardware enabling it to communicate with the host 602 and UE 606. The connection 660 may be direct or pass through a core network (like core network 106 of FIG. 4) and/or one or more other intermediate networks, such as one or more public, private, or hosted networks. For example, an intermediate network may be a backbone network or the Internet.

The UE 606 includes hardware and software, which is stored in or accessible by UE 606 and executable by the UE's processing circuitry. The software includes a client application, such as a web browser or operator-specific "app" that may be operable to provide a service to a human or non-human user via UE 606 with the support of the host 602. In the host 602, an executing host application may communicate with the executing client application via the OTT connection 650 terminating at the UE 606 and host 602. In providing the service to the user, the UE's client application may receive request data from the host's host application and provide user data in response to the request data. The OTT connection 650 may transfer both the request data and the user data. The UE's client application may interact with the user to generate the user data that it provides to the host application through the OTT connection 650.

The OTT connection 650 may extend via a connection 660 between the host 602 and the network node 604 and via a wireless connection 670 between the network node 604 and the UE 606 to provide the connection between the host 602 and the UE 606. The connection 660 and wireless connection 670, over which the OTT connection 650 may be provided, have been drawn abstractly to illustrate the communication between the host 602 and the UE 606 via the network node 604, without explicit reference to any intermediary devices and the precise routing of messages via these devices.

As an example of transmitting data via the OTT connection 650, in step 608, the host 602 provides user data, which may be performed by executing a host application. In some embodiments, the user data is associated with a particular human user interacting with the UE 606. In other embodiments, the user data is associated with a UE 606 that shares data with the host 602 without explicit human interaction. In step 610, the host 602 initiates a transmission carrying the user data towards the UE 606. The host 602 may initiate the transmission responsive to a request transmitted by the UE 606. The request may be caused by human interaction with the UE 606 or by operation of the client application executing on the UE 606. The transmission may pass via the network node 604, in accordance with the teachings of the embodiments described throughout this disclosure. Accordingly, in step 612, the network node 604 transmits to the UE 606 the user data that was carried in the transmission that the host 602 initiated, in accordance with the teachings of the embodiments described throughout this disclosure. In step 614, the UE 606 receives the user data carried in the transmission, which may be performed by a client application executed on the UE 606 associated with the host application executed by the host 602.

In some examples, the UE 606 executes a client application which provides user data to the host 602. The user data may be provided in reaction or response to the data received from the host 602. Accordingly, in step 616, the UE 606 may provide user data, which may be performed by executing the client application. In providing the user data, the client application may further consider user input received from the user via an input/output interface of the UE 606. Regardless of the specific manner in which the user data was provided, the UE 606 initiates, in step 618, transmission of the user data towards the host 602 via the network node 604. In step 620, in accordance with the teachings of the embodiments described throughout this disclosure, the network node 604 receives user data from the UE 606 and initiates transmission of the received user data towards the host 602. In step 622, the host 602 receives the user data carried in the transmission initiated by the UE 606.

One or more of the various embodiments improve the performance of OTT services provided to the UE 606 using the OTT connection 650, in which the wireless connection 670 forms the last segment. More precisely, the teachings of these embodiments may improve the handling of colliding signals and/or channels and thereby provide benefits such as improving measurement latency and bypassing the measurement gap request procedure to improve positioning quality.

In an example scenario, factory status information may be collected and analyzed by the host 602. As another example, the host 602 may process audio and video data which may have been retrieved from a UE for use in creating maps. As another example, the host 602 may collect and analyze real-time data to assist in controlling vehicle congestion (e.g., controlling traffic lights). As another example, the host 602 may store surveillance video uploaded by a UE. As another example, the host 602 may store or control access to media content such as video, audio, VR or AR which it can broadcast, multicast or unicast to UEs. As other examples, the host 602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 650 between the host 602 and UE 606, in response to variations in the measurement results. The measurement procedure and/or the network functionality for reconfiguring the OTT connection may be implemented in software and hardware of the host 602 and/or UE 606. In some embodiments, sensors (not shown) may be deployed in or in association with other devices through which the OTT connection 650 passes; the sensors may participate in the measurement procedure by supplying values of the monitored quantities exemplified above, or supplying values of other physical quantities from which software may compute or estimate the monitored quantities. The reconfiguring of the OTT connection 650 may include message format, retransmission settings, preferred routing etc.; the reconfiguring need not directly alter the operation of the network node 604. Such procedures and functionalities may be known and practiced in the art. In certain embodiments, measurements may involve proprietary UE signaling that facilitates measurements of throughput, propagation times, latency and the like, by the host 602. The measurements may be implemented in that software causes messages to be transmitted, in particular empty or 'dummy' messages, using the OTT connection 650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The above-described embodiments are intended to be examples only. Alterations, modifications and variations may be effected to the particular embodiments by those of skill in the art without departing from the scope of the description.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
6G 6th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
eMBMS evolved Multimedia Broadcast Multicast Services
E-SMLC Evolved-Serving Mobile Location Centre
ECGI Evolved CGI
eNB E-UTRAN NodeB
ePDCCH Enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
gNB Base station in NR
GNSS Global Navigation Satellite System
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MAC Message Authentication Code
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
USIM Universal Subscriber Identity Module
UTDOA Uplink Time Difference of Arrival
WCDMA Wide CDMA
WLAN Wide Local Area Network

The invention claimed is:

1. A method performed by a wireless device, the method comprising:
- transmitting an indication that the wireless device is configured to measure positioning reference signals (PRSs) without configuration of a measurement gap;
- receiving configuration information including a priority indicator, the priority indicator indicating a priority of reception of at least one channel with respect to reception of PRSs;
- determining a priority associated with a PRS transmission and an overlapping downlink (DL) channel transmission in accordance with the priority indicator; and
- responsive to determining that the PRS priority is higher than the DL channel, measuring at least one PRS outside of the measurement gap;
- responsive to determining that the PRS priority is lower than the DL channel, receiving the DL channel transmission.

2. The method of claim 1, wherein the priority indicator is received in a Downlink Control Information (DCI) message.

3. The method of claim 2, wherein the DCI message dynamically schedules the DL channel.

4. The method of claim 2, wherein the DCI message is one of: a DL DCI format 1_1 or a DL DCI format 1_2.

5. The method of claim 1, wherein the priority indicator indicates that the PRS priority is lower than a first type of data on the DL channel, and the PRS priority is higher than a second type of data on the DL channel.

6. The method of claim 5, wherein the first type of data is ultra-reliable low latency communication (URLLC).

7. The method of claim 1, wherein the priority indicator is received in one of: a RRC message, a MAC CE message and PRS configuration information.

8. The method of claim 1, wherein the priority indicator is received in one of: a PDSCH-Config information element (IE), a SPS-Config IE, a NZP-CSI-RS-Resource IE, a NZP-CSI-RS-ResourceSet IE, a CSI-ResourceConfig IE, and a CSI-Aperiodic TriggerStateList IE.

9. The method of claim 1, wherein the priority indicator indicates that the PRS priority is lower than at least one of: a periodic reference signal, an aperiodic reference signal, and a semi-persistent reference signal.

10. The method of claim 1, wherein the DL channel is one of a physical downlink shared channel (PDSCH) and a physical downlink control channel (PDCCH).

11. The method of claim 1, wherein the DL channel is dynamically scheduled.

12. A wireless device comprising a radio interface and processing circuitry configured to:

transmit an indication that the wireless device is configured to measure positioning reference signals (PRSs) without configuration of a measurement gap;

receive configuration information including a priority indicator, the priority indicator indicating a priority of reception of at least one channel with respect to reception of PRSs;

determine a priority associated with a PRS transmission and an overlapping downlink (DL) channel transmission in accordance with the priority indicator; and responsive to determining that the PRS priority is higher than the DL channel, measure at least one PRS outside of the measurement gap;

responsive to determining that the PRS priority is lower than the DL channel, receive the DL channel transmission.

13. The wireless device of claim 12, wherein the priority indicator is received in a Downlink Control Information (DCI) message.

14. The wireless device of claim 13, wherein the DCI message dynamically schedules the DL channel.

15. The wireless device of claim 13, wherein the DCI message is one of: a DL DCI format 1_1 or a DL DCI format 1_2.

16. The wireless device of claim 12, wherein the priority indicator indicates that the PRS priority is lower than a first type of data on the DL channel, and the PRS priority is higher than a second type of data on the DL channel.

17. The wireless device of claim 16, wherein the first type of data is ultra-reliable low latency communication (URLLC).

18. The wireless device of claim 12, wherein the priority indicator is received in one of: a RRC message, a MAC CE message and PRS configuration information.

19. The wireless device of claim 12, wherein the priority indicator is received in one of: a PDSCH-Config information element (IE), a SPS-Config IE, a NZP-CSI-RS-Resource IE, a NZP-CSI-RS-ResourceSet IE, a CSI-ResourceConfig IE, and a CSI-AperiodicTriggerStateList IE.

20. The wireless device of claim 12, wherein the priority indicator indicates that the PRS priority is lower than at least one of: a periodic reference signal, an aperiodic reference signal, and a semi-persistent reference signal.

21. The wireless device of claim 12, wherein the DL channel is one of a physical downlink shared channel (PDSCH) and a physical downlink control channel (PDCCH).

22. The wireless device of claim 12, wherein the DL channel is dynamically scheduled.

23. A method performed by a network node, the method comprising:

obtaining capability information indicating that a wireless device is configured to measure positioning reference signals (PRSs) without configuration of a measurement gap;

generating configuration information including a priority indicator indicating a priority of reception of at least one channel with respect to reception of PRSs, wherein the priority indicator indicates that the PRS priority is lower than a first type of data on the DL channel, and the PRS priority is higher than a second type of data on the DL channel; and transmitting, to the wireless device, the configuration information including the priority indicator.

24. The method of claim 23, wherein the priority indicator is transmitted in a Downlink Control Information (DCI) message.

25. The method of claim 24, wherein the DCI message dynamically schedules the DL channel.

26. The method of claim 24, wherein the DCI message is one of: a DL DCI format 1_1 or a DL DCI format 1_2.

27. The method of claim 23, wherein the priority indicator is transmitted in one of: a RRC message, a MAC CE message and PRS configuration information.

28. The method of claim 23, wherein the priority indicator indicates that the PRS priority is lower than at least one of: a periodic reference signal, an aperiodic reference signal, and a semi-persistent reference signal.

29. The method of claim 23, wherein the DL channel is one of a physical downlink shared channel (PDSCH) and a physical downlink control channel (PDCCH).

* * * * *